(12) United States Patent
Isaksson et al.

(10) Patent No.: US 12,735,581 B2
(45) Date of Patent: Sep. 15, 2026

(54) ANTIFOULING COMPOUNDS

(71) Applicant: I-Tech AB, Mölndal (SE)

(72) Inventors: Dan Isaksson, Mölndal (SE); Markus Hoffmann, Sant Cugat (ES)

(73) Assignee: I-TECH AB, Mölndal (SE)

( * ) Notice: Subject to any disclaimer, the term of this patent is extended or adjusted under 35 U.S.C. 154(b) by 607 days.

(21) Appl. No.: 18/249,589

(22) PCT Filed: Oct. 20, 2021

(86) PCT No.: PCT/SE2021/051046
§ 371 (c)(1),
(2) Date: Apr. 19, 2023

(87) PCT Pub. No.: WO2022/086416
PCT Pub. Date: Apr. 28, 2022

(65) Prior Publication Data

US 2023/0383129 A1 Nov. 30, 2023

(30) Foreign Application Priority Data

Oct. 21, 2020 (SE) .................................... 2051222-4

(51) Int. Cl.
*C09D 5/16* (2006.01)
*C09D 133/14* (2006.01)

(52) U.S. Cl.
CPC ........... *C09D 5/165* (2013.01); *C09D 133/14* (2013.01)

(58) Field of Classification Search
CPC ...................................................... C09D 5/165
See application file for complete search history.

(56) References Cited

U.S. PATENT DOCUMENTS 7,531,581 B2 5/2009 Nyden et al.
10,239,898 B2 3/2019 Hallack et al.
2006/0201379 A1 9/2006 Nyden et al.

FOREIGN PATENT DOCUMENTS

EP 2551309 A1 1/2013
EP 3339387 A1 6/2018
EP 3480267 A1 5/2019
EP 3480268 A1 5/2019
EP 3540022 A1 9/2019
WO 2006096129 A1 9/2006
WO WO-2010018144 A1 * 2/2010 ........... C09D 5/1687

(Continued)

OTHER PUBLICATIONS

Macdonald et al. “Comparison of the behavioral and neurochemical effects of the two optical enantiomers of medetomidine, a selective alpha-2-adrenoceptor agonist” Journal of Pharmacology and Experimental Therapeutics, 259:848-854 (1991).

(Continued)

*Primary Examiner* — Benjamin J Packard
(74) *Attorney, Agent, or Firm* — Myers Bigel, P.A.

(57) ABSTRACT

The present embodiments relate to an antifouling polymer comprising a plurality of repeating units. At least a portion of the plurality of repeating units comprises medetomidine, or an enantiomer, base or salt thereof, covalently bound to the repeating unit through a hydrolysable bond. The antifouling polymer can comprised in an antifouling composition applied as a surface coating on underwater or submersible structures to prevent or at least inhibit marine biofouling on surfaces of the structures.

15 Claims, 16 Drawing Sheets

M1

M0

I

M2

(56) References Cited

FOREIGN PATENT DOCUMENTS

| | | | |
|---|---|---|---|
| WO | 2011070069 | A1 | 6/2011 |
| WO | 2012175469 | A1 | 12/2012 |
| WO | 2013014428 | A1 | 1/2013 |
| WO | 2013182641 | A1 | 12/2013 |
| WO | 2016120635 | A1 | 8/2016 |

OTHER PUBLICATIONS

Savola et al. "Central α2-adrenoceptors are highly stereoselective for dexmedetomidine, the dextro enantiomer of medetomidine" European Journal of Pharmacology, 195(2):193-199 (1991).

Svenson et al. "On the thermal and chemical stability of molecularly imprinted polymers" Analytica Chimica Acta, 435:19-24 (2001).

International Search Report and the Written Opinion of the International Searching Authority corresponding to International Patent Application No. PCT/SE2021/051046 (12 pages) (mailed Jan. 25, 2022).

* cited by examiner

M3

I

M4

M5

I

M6

PSB

ANTIFOULING COMPOUNDS

TECHNICAL FIELD

The present embodiments generally relate to antifouling compounds, methods for producing such antifouling compounds and the use thereof in surface coatings.

BACKGROUND

Biofouling presents several issues for underwater structures and, thus, there is a general need to prevent and reduce biofouling on such structures. There are numerous antifouling approaches currently employed, including the use of specific coatings that deter biofouling, the use of toxins or biocides having antifouling activity as additives in coatings or paints for surfaces, and the use of mechanical cleaning of surfaces. The toxins or biocides can cause a physiological disruption or disturbance of the organism, or result in killing the organism. The toxic or biocidal effects may occur prior to, during or after adhesion of the organism, with the final outcome that the organism falls off the coated surface. A number of different substances are employed for this purpose depending on the organism to deter from fouling surfaces. Certain coatings present surfaces that physically deter organisms so that they cannot easily adhere to the surface. These types of coatings are generally hydrophobic, smooth, slippery and have low friction, such as elastomers, including silicone rubbers. Self-polishing coatings (SPCs) slowly degrade over time so that the attached organisms will be shed or fall off the coated surface. The degradation is often caused by a slow, controlled hydrolysis of a component in the coating, usually a binder component and dissolution of water soluble pigments.

There are both economic and environmental benefits of reducing biofouling on marine and freshwater installations. For example, biofouling reduces fuel efficiency for ships, reduces profitable operation time of ships during the biofouling cleaning procedures and decreases cooling power of cooling water equipment, to mention a few.

U.S. Pat. No. 7,531,581 discloses a method and use of an antifouling paint that specifically and efficiently impede settlement of, for example, barnacles on aquatic structures, by the formation of an ionic pair between an imidazole containing compound, such as medetomidine, and a sulfonated, acid sulphate ester, phosphonic acid, carboxylic acid or acid phosphate ester modified polymer backbone, such as polystyrene or acrylate polymers.

U.S. Pat. No. 10,239,898 discloses compounds based on adducts with isocyanates and a method for preparation thereof comprising reacting 3-isocyanatopropyltrimethoxysilane with medetomidine, compositions comprising these compounds and also use thereof as, or for producing, coatings.

CZ 30 799 discloses a hydrophobic antimicrobial polymer system consisting of a reactive polymer or a reactive polymerizable monomer with at least one covalently bound antimicrobial substance having acidic hydrogen atoms in its structure and at least one main hydrophobizing component. The main hydrophobizing component is 2,2,3,3-tetrafluoro-1-propanol or 2,2,3,3,4,4,5,5-octafluoro-1-pentanol, or a combination thereof. The hydrophobic antimicrobial polymer system comprises at least one excipient, which is a catalyst or a pH stabilizer.

There is, however, still a need for antifouling compounds that, in addition to antifouling capability, have desired and improved properties for usage in coatings and materials used on underwater or submersible installations and equipment.

SUMMARY

It is a general objective to provide antifouling polymers acting as polymeric carriers of antifouling agents, and monomers that can be polymerized into such antifouling polymers.

It is a particular objective to provide antifouling polymers and monomers that can be used in surface coatings in underwater or submersible installations and equipment.

These and other objectives are met by embodiments as disclosed herein.

The present invention is defined by the independent claims. Further embodiments of the invention are defined by the dependent claims.

An aspect of the invention relates to an antifouling polymer comprising a plurality of repeating units. At least a portion of the plurality of repeating units comprises medetomidine, or an enantiomer, base or salt thereof, covalently bound to the repeating unit through a hydrolysable bond.

Another aspect of the invention relates to a polymerizable monomer comprising medetomidine, or an enantiomer, base or salt thereof, covalently bound to the polymerizable monomer through a hydrolysable bond.

A further aspect of the invention relates to a method of producing a medetomidine monomer. The method comprises reacting a polymerizable monomer comprising an electrophilic site with medetomidine, or an enantiomer, base or salt thereof, to covalently bind medetomidine, or the enantiomer, base or salt thereof, to the monomer through a hydrolysable bond formed between the electrophilic site and a nitrogen on the imidazole ring of medetomidine, or the enantiomer, base or salt thereof.

Yet another aspect of the invention relates to a method of producing an antifouling polymer. The method comprises polymerizing monomers comprising medetomidine, or an enantiomer, base or salt thereof, covalently bound to the monomer through a hydrolysable bond and optionally monomers lacking medetomidine, or an enantiomer, base or salt thereof, to form an antifouling polymer comprising a plurality of repeating units derived from monomers. At least a portion of the plurality of repeating units comprises medetomidine, or the enantiomer, base or salt thereof, covalently bound to the repeating unit through a hydrolysable bond.

A further aspect of the invention relates to a method of producing an antifouling polymer. The method comprises covalently binding medetomidine, or an enantiomer, base or salt thereof, to a polymer comprising a plurality of repeating units so that at least a portion of the plurality of repeating units comprises medetomidine, or the enantiomer, base or salt thereof, covalently bound to the repeating unit through a hydrolysable bond.

The antifouling compounds of the present invention, i.e., antifouling polymers and polymerizable monomers, have several advantages as compared to using free medetomidine in antifouling coatings. The antifouling compounds improve the lifetime of the antifouling coating by evenly distributing the antifouling agent, i.e., medetomidine, throughout the antifouling coating and control the release rate of medetomidine from the antifouling compounds in the antifouling coating. As a consequence, less medetomidine can be used in the antifouling coating as compared to antifouling coating comprising free medetomidine and still achieving corresponding antifouling effects. The antifouling compounds also enable formulation of antifouling coatings without the need for inorganic carriers, such as metal oxide particles, and thereby make it possible to formulate metal free coatings.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Figure 1:
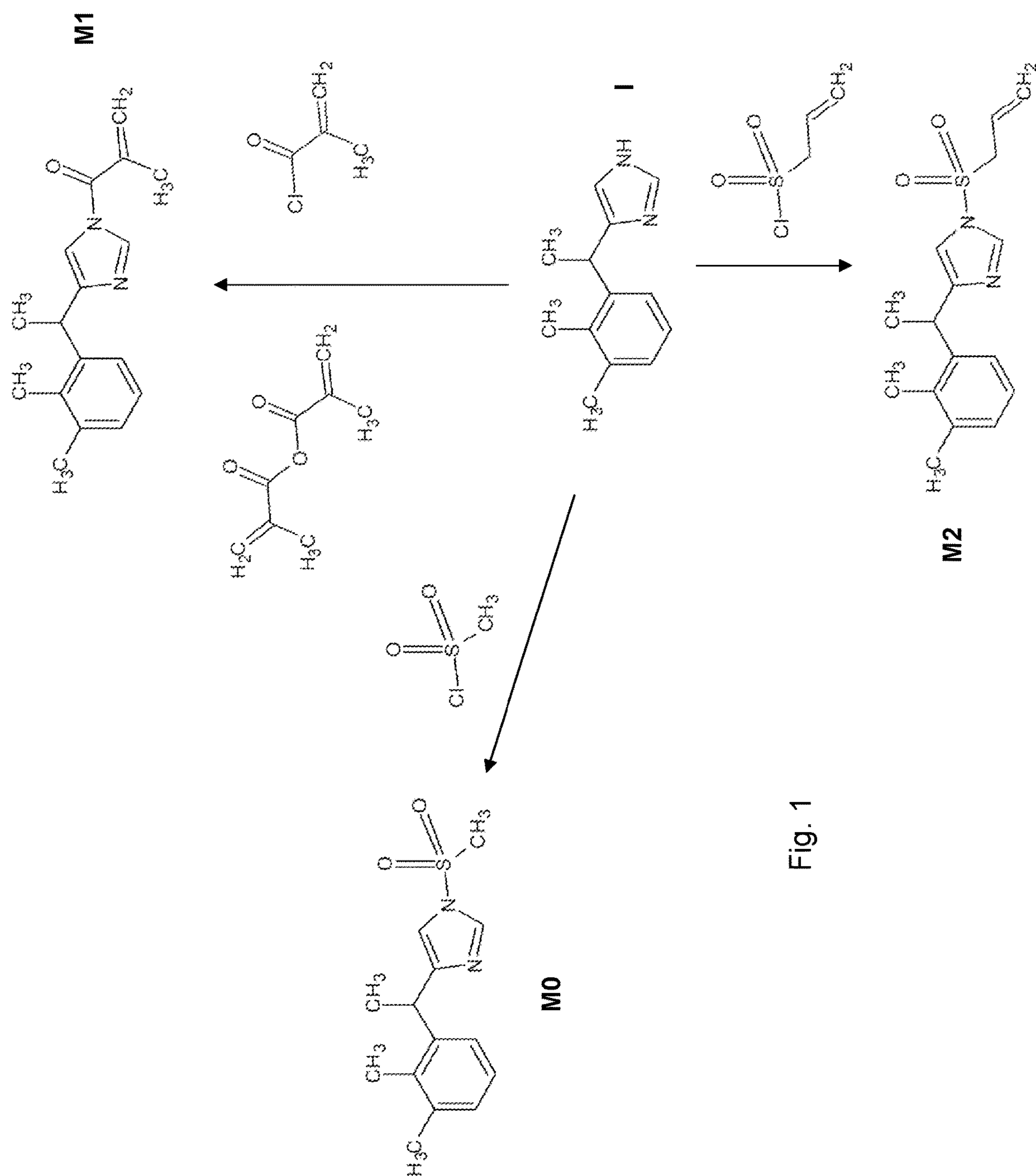
FIG. 1 illustrates a reaction scheme for the production of 1-{4-[1-(2,3-dimethylphenyl)ethyl]-1H-imidazol-1-yl}-2-methylprop-2-en-1-one (M1), 4-[1-(2,3-dimethylphenyl) ethyl]-1-(prop-2-ene-1-sulfonyl)-$^1$H-imidazole (M2) and 4-[1-(2,3-dimethylphenyl)ethyl]-1-(methanesulfonyl)-1H-imidazole (M0) according to an embodiment.

The foregoing and other aspects of the embodiments will now be described in more detail with respect to the description and methodologies provided herein. It should be appreciated that the invention may be embodied in different forms and should not be construed as limited to the embodiments set forth herein. Rather, these embodiments are provided so that this disclosure will be thorough and complete, and will fully convey the scope of the invention to one of ordinary skill in the art.

The one of ordinary skill in the art will understand that terminology used in the description herein is for the purpose of describing particular embodiments only and is not intended to be limiting of the invention. Unless otherwise defined, all terms, including technical and scientific terms used in the description, have the same meaning as commonly understood by one of ordinary skill in the art to 30 which this invention belongs.

As used in the description of the embodiments, the singular forms "a," "an" and "the" are intended to include the plural forms as well, unless the context clearly indicates otherwise. Thus, such references may be replaced with a reference to "one or more", e.g., one, of the relevant component or integer. As used herein, all references to "one or more" of a particular component or integer will be understood to refer to from one to a plurality, e.g., two, three or four, of such components or integers. It will be understood that references to "one or more" of a particular component or integer will include a particular reference to one such integer. Also, as used herein, "and/or" refers to and encompasses any and all possible combinations of one or more of the associated listed items. Furthermore, the term "about," as used herein when referring to a measurable value, such as an amount of a compound, dose, time, temperature, and the like, refers to variations of 20%, 10%, 5%, 1%, 0.5%, or even 0.1% of the specified amount. When a range is employed, e.g., a range from x to y, it is it meant that the measurable value is a range from about x to about y, or any range or value therein including x and y. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof.

"Effective amount" as used herein refers to an amount of a compound, composition and/or formulation that is sufficient to produce a desired effect.

All patents, patent applications and publications referred to herein are incorporated by reference in their entirety. In the event of conflicting terminology, the present specification is controlling.

The present embodiments generally relate to antifouling compounds, methods for producing such antifouling compounds and the use thereof in surface coatings.

Medetomidine, also referred to as (±)-4-[1-(2,3-dimethylphenyl)ethyl)-1H-imidazole, see formula I, is a highly selective α2-adrenoreceptor agonist. There are two tautomers of the imidazole group of medetomidine resulting in 4-[0-(2,3-dimethylphenyl)ethyl)-1H-imidazole as shown in formula I or its tautomer 5-[1-(2,3-dimethylphenyl)ethyl)-1H-imidazole.

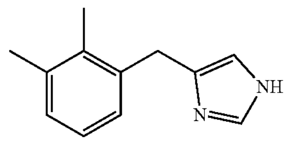
(I)

Medetomidine is a highly efficient inhibitor of barnacles and impede larval settlement already at low concentrations, 1-10 nM. Medetomidine interacts with octopamine receptors in the barnacle cyprid larva, causing the legs of the larva to kick and thereby prevents the larva from settling onto medetomidine containing or releasing surface. Medetomidine has also shown effect on other hard fouling, such as tube worms.

Medetomidine is a racemic mixture of the two optical enantiomers, the levo- and dextro-rotary optical isomers (*Journal of pharmacology and experimental therapeutics,* 259: 848-854, 1991*; European Journal of Pharmacology,* 195: 193-199, 1991) with generic names levomedetomidine and dexmedetomidine, respectively. A process for the preparation of the racemic mixture of medetomidine and related intermediates is disclosed in WO 2011/070069. Many of the previous medetomidine syntheses used expensive 4-substituted imidazole derivatives as starting material. However, the synthesis presented in WO 2011/070069 is made from affordable commercially available starting materials, where the imidazole ring is instead formed during the synthesis. WO 2013/014428 describes a novel process of preparing medetomidine, including novel intermediates thereof, avoiding potentially disadvantageous use of imidazole derivatives as starting material. WO 2016/120635 relates to new processes for preparation of intermediates, such as 3-arylbutanals, useful in the synthesis of medetomidine.

The terms medetomidine, dexmedetomidine, and levomedetomidine as used herein include salts, bases and solvates thereof unless specifically stated otherwise. Acceptable salts of medetomidine, dexmedetomidine, and levomedetomidine include acid addition salts and base addition salts. Such salts may be formed by conventional means, for example by reaction of a free acid or a free base form of medetomidine, dexmedetomidine, and levomedetomidine with one or more equivalents of an appropriate acid or base, optionally in a solvent, or in a medium in which the salt is insoluble, followed by removal of the solvent, or the medium, using standard techniques, e.g., in vacuum or by freeze-drying. Salts may also be prepared by exchanging a counter-ion of medetomidine, dexmedetomidine, and levomedetomidine in the form of a salt with another counter-ion, for example using a suitable ion exchange resin. An illustrative, but non-limiting, example of a salt of medetomidine is medetomidine hydrochloride. For the avoidance of doubt, other acceptable derivatives of medetomidine, dexmedetomidine, and levomedetomidine are included within the scope of the invention, e.g., solvates, etc.

The enantiomers of medetomidine may be isolated and separated from each other by separation of racemic or other mixtures of the enantiomers using chiral resolution or chiral column chromatography known in the art. Alternatively the desired enantiomer may be prepared by enantio-selective synthesis, also called chiral synthesis or asymmetric synthesis, which is defined as a chemical reaction, or reaction sequence, in which one or more new elements of chirality are formed in a substrate molecule and which produces the stereoisomeric products in unequal amounts.

The base form of medetomidine is distributed by the company I-Tech AB under the product name SELEKTOPE®.

Medetomidine has been suggested to be used in free form, i.e., as free medetomidine molecules, in antifouling compositions thereby allowing medetomidine molecules to diffuse through an antifouling coating when coating a surface with the antifouling composition. This may cause the antifouling coating to be depleted of medetomidine too fast and reduce the lifetime of the antifouling coating. Hence, medetomidine attached to carriers have been suggested to reduce this risk and help to control the leaching rate. So far, carriers in the form of metal oxide particles, in particular zinc oxide (ZnO) or cupper(I) oxide ($Cu_2O$) or copper (II) oxide (CuO) particles, have been used in antifouling composition (US 2006/0201379). Such metal oxide particles, however, limit the applications of the antifouling compositions since there may be a desire to have zinc or copper free antifouling compositions.

The present invention is based on using polymerizable monomers as carrier for medetomidine and where these polymerizable monomers can be further polymerized into polymers acting as polymeric carriers of the antifouling agent medetomidine. Such medetomidine monomers and polymers solve the problem of free medetomidine leaking too fast from antifouling coatings and thereby improve the lifetime of the antifouling coatings. Furthermore, this improved control of the leaching rate of medetomidine is achieved without the need for using metal oxide particles.

In some antifouling compositions, it may not be possible to add medetomidine directly due to incompatibility issues. For instance, a solvent for medetomidine may not be compatible with other ingredients of the antifouling composition and/or any metal oxide particles used as medetomidine carriers may limit the usage of additional ingredients due to incompatible issues. A related issue is that some binder systems used in antifouling compositions are sensitive to the addition of additives, including organic biocides, such as free medetomidine, which may trigger gelation of the antifouling composition. This problem may be eliminated or at least reduced by attaching medetomidine to a monomer or polymer carrier according to the invention.

In the following, various aspects and embodiments of the present invention are described in further detail with reference to medetomidine. These aspects and embodiments also encompass an enantiomer of medetomidine, such as dexmedetomidine or levomedetomidine, a salt of medetomidine, a salt of dexmedetomidine, or a salt of levomedetomidine, or a base of medetomidine, a base of dexmedetomidine, or a base of levomedetomidine collectively denoted medetomidine, or an enantionmer, base or salt thereof herein. Thus, reference to medetomidine herein should be regarded as relating to medetomidine, a salt of medetomidine, a base of medetomidine, dexmedetomidine, a salt of dexmedetomidine, a base of dexmedetomidine, levomedetomidine, a salt of levomedetomidine, and/or a base of levomedetomidine unless indicated otherwise.

An aspect of the invention relates to an antifouling polymer comprising a plurality of repeating units. According to the invention, at least a portion of the plurality of repeating units comprises medetomidine, or an enantiomer, base or salt thereof, covalently bound to the repeating unit through a hydrolysable bond.

The antifouling polymer of the invention comprises a plurality of monomers, also referred to as repeating unit or repeat unit in the art, of which at least a portion thereof is carriers of medetomidine, i.e., comprises medetomidine attached to the repeating unit through a hydrolysable covalent bond. The antifouling polymer therefore comprises a plurality of repeating units derived from monomers. The covalent bond between medetomidine and at least a portion of the repeating units in the antifouling polymer means that these repeating units and thereby the antifouling polymer act or acts a carrier of medetomidine. The covalent bond is, however, hydrolysable. This means medetomidine can be released from the repeating units in the antifouling polymer through hydrolysis when in contact with water, see FIG. 8. Such a hydrolysis of the covalent bond enables a controlled release and leaching of free medetomidine from an antifouling coating made from and comprising the antifouling polymer of the invention.

An additional advantage of covalently bonding medetomidine to monomers or repeating units derived from such monomers through a hydrolysable bond is that the antifouling polymer becomes more hydrophilic and water soluble as medetomidine is hydrolyzed from its repeating units. A surface of an antifouling coating comprising the antifouling polymers will thereby become polished and refreshed due to the hydrolysis. Hence, such polishing and refreshing action caused by the hydrolysis of the covalent bond between medetomidine and repeating units in the antifouling polymer will even further contribute to the antifouling capability of the antifouling coating comprising the antifouling polymers of the present invention.

The antifouling polymer of the present invention could be a homopolymer, i.e., a polymer containing only a single type of repeating units, i.e., monomers, comprising medetomidine. Hence, in such an embodiment, the antifouling polymer is a homopolymer of repeating units comprising medetomidine, or the enantiomer, base or salt thereof.

Illustrative, but non-limiting, examples of such homopolymer are homopolymers made of repeating units or monomers selected from the group consisting of a medetomidine methacrylate, such as 1-{4-[1-(2,3-dimethylphenyl)ethyl]-$^1$H-imidazol-1-yl}-2-methylprop-2-en-1-one (M1) or 1-{5-[1-(2,3-dimethylphenylethyl]-1H-imidazol-1-yl}-2-methylprop-2-en-1-one, 2-({4-[1-(2,3-dimethylphenyl)ethyl]-1H-imidazole-1-carbonyl}amino)ethyl 2-methylprop-2-enoate (M6) or 2-({5-[1-(2,3-dimethylphenyl)ethyl]-1H-imidazole-1-carbonyl}amino)ethyl 2-methylprop-2-enoate; an allylsulfonyl medetomidine, such as 4-[1-(2,3-dimethylphenyl) ethyl]-1-(prop-2-ene-1-sulfonyl)-1H-imidazole (M2) or 5-[1-(2,3-dimethylphenyl)ethyl]-1-(prop-2-ene-1-sulfonyl)-1H-imidazole; an allyl medetomidine, such as prop-2-en-1-yl 4-[1-(2,3-dimethylphenyl)ethyl]-1H-imidazole-1-carboxylate (M3) or prop-2-en-1-yl 5-[1-(2,3-dimethylphenyl) ethyl]-1H-imidazole-1-carboxylate, 4-[1-(2,3-dimethylphenyl)ethyl]-N-(prop-2-en-1-yl)-1H-imidazole-1-carboxamide (M4) or 5-[1-(2,3-dimethylphenyl)ethyl]-N-(prop-2-en-1-yl)-$^1$H-imidazole-1-carboxamide; a medetomidine acrylate, such as 2-({4-[1-(2,3-dimethylphenyl)ethyl]-1H-imidazole-1-carbonyl}amino)ethyl prop-2-enoate (M5) or 2-({5-[1-(2,3-dimethylphenyl)ethyl]-1H-imidazole-1-carbonyl}amino)ethyl prop-2-enoate; and a silyl medetomidine, such as 2-({4-[1-(2,3-dimethylphenyl) ethyl]-1H-imidazole-1-carbonyl}amino)ethyl prop-2-enoate (M10) or 2-({5-[1-(2,3-dimethylphenyl)ethyl]-1H-imidazole-1-carbonyl}amino)ethyl prop-2-enoate, 3-(4-[1-(2,3-dimethylphenyl)ethyl]-1H-imidazole-1-dimethylsilyl)propyl 2-methylprop-2-enoate (M11) or 3-(5-[1-(2,3-dimethylphenyl)ethyl]-1H-imidazole-1-dimethylsilyl) propyl 2-methylprop-2-enoate.

In an embodiment, the homopolymer is selected from the group consisting of a poly(medetomidine methacrylate), a poly(allylsulfonyl medetomidine), a poly(allyl medetomidine), a poly(medetomidine acrylate) and a poly(silyl medetomidine).

The present invention is, however, not limited to antifouling polymers in the form of homopolymers. Hence, the antifouling polymer may alternatively be in the form of a co-polymer, i.e., a polymer containing two or more types of repeating units, i.e., monomers. Hence, in an embodiment, the antifouling polymer is a co-polymer comprising a first type of repeating unit comprising medetomidine, or the enantiomer, base or salt thereof, and the first type of repeating unit lacking medetomidine, or the enantiomer, base or salt thereof. Hence, in this co-polymer the same type of repeating unit is used in the polymerization to form the antifouling polymer. However, some of these repeating units comprise medetomidine, or the enantiomer, base or salt thereof, covalently bound to the repeating unit through a hydrolysable bond whereas remaining repeating units in the co-polymer do not comprise any medetomidine.

Alternatively, the antifouling polymer could be a co-polymer of different types of repeating units. In an embodiment, the antifouling polymer is a co-polymer comprising a first type of repeating unit comprising medetomidine, or the enantiomer, base or salt thereof, a second, different type of repeating unit comprising medetomidine, or the enantiomer, base or salt thereof, and optionally the first type of repeating unit lacking medetomidine, or the enantiomer, base or salt thereof, and/or optionally the second, different type of repeating unit lacking medetomidine, or the enantiomer, base or salt thereof. In this embodiment, both first and second repeating units comprise medetomidine covalently bond thereto using a hydrolysable bond. In another embodiment, the antifouling polymer is a co-polymer comprising a first type of repeating unit comprising medetomidine, or the enantiomer, base or salt thereof, a second, different type of repeating unit lacking medetomidine, or the enantiomer, base or salt thereof, and optionally the first type of repeating unit lacking medetomidine, or the enantiomer, base or salt thereof. In this embodiment, medetomidine is only covalently bond to first type of repeating units, whereas the second type of repeating units does not comprise any covalently attached medetomidine.

The invention also encompasses a co-polymer comprising more than two types of repeating units. In such an embodiment, all of the different types of repeating units may comprise medetomidine covalently attached thereto through a hydrolysable bond or only one or a portion of the different types of repeating units is used as medetomidine carrier.

Illustrative, but non-limiting, examples of monomers or repeating units lacking medetomidine covalently attached thereto can be selected among the above described monomers or repeating units and may, also include, methyl methacrylate (MMA), methylacrylate, butyl methacrylate (BMA), butyl acrylate, 2-methoxyethyl acrylate (MEA), tri-isopropylsilyl methacrylate, and/or tri-isopropylsilyl acrylate (TIPSA).

Illustrative, but non-limiting, examples of co-polymers include a co-polymer between any of monomer M0 to M11 and at least one other monomer lacking medetomidine as mentioned above, i.e., MMA, BMA, butyl acrylate, MEA, tri-isopropylsilyl methacrylate, and/or TIPSA. As illustrative examples, the co-polymer could be a co-polymer between M6 and MMA, such as co-polymer CP6R1 or CP6R2 as disclosed herein; a co-polymer between M5 and MMA, such as co-polymer CP5R1 as disclosed herein, a co-polymer between M6, MMA and TIPS, a co-polymer between M5, MMA and TIPS, a co-polymer between M6, MMA, TIPSA and MEA; a co-polymer between M6, MMA, TIPSA and BMA; a co-polymer between M5, MMA, TIPSA and MEA; or a co-polymer between M5, MMA, TIPSA and BMA.

Another aspect of the invention relates to a polymerizable monomer comprising medetomidine, or an enantiomer, base or salt thereof, covalently bound to the polymerizable monomer through a hydrolysable bond.

In an embodiment, medetomidine, or the enantiomer, base or salt thereof, is covalently bound to the monomer through the hydrolysable bond between a nitrogen on the imidazole ring of medetomidine, or the enantiomer, base or salt thereof, and the monomer.

The imidazole ring of medetomidine comprises two nitrogen atoms at position 1 and 3, of which the nitrogen with an attached hydrogen is at position 1. In an embodiment, medetomidine, or the enantiomer, base or salt thereof, is covalently bound to the monomer through the hydrolysable bond between a nitrogen at position 1 on the imidazole ring of medetomidine, or the enantiomer, base or salt thereof, and the monomer.

In a particular embodiment, medetomidine, or the enantiomer, base or salt thereof, is covalently bound to the monomer through the hydrolysable bond between a nitrogen on the imidazole ring of medetomidine, or the enantiomer, base or salt thereof, and a carbon, silicon or sulfur on the monomer. Hence, in this particular embodiment, the hydrolysable bond is an N—C, N—S1 or a N—S bond.

In an embodiment, the monomer comprising medetomidine, or the enantiomer, base or salt thereof, has a general formula II or III:

(II)

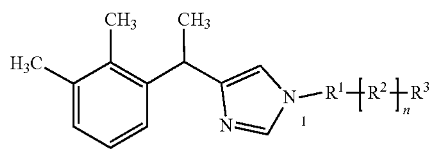

(III)

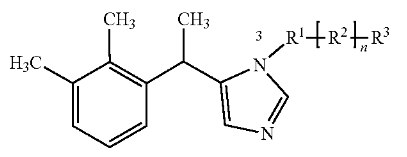

In an embodiment, $R^1$ is selected from the group consisting of carbonyl, sulphonyl, and dimethylsilyl. Hence, in a particular embodiment $R^1$ is selected from the group consisting of formula IV to VI:

(IV)

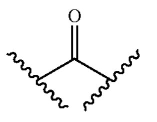

(V)

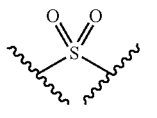

-continued (VI)

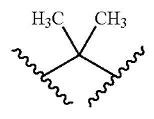

In an embodiment, $R^2$ is selected from the group consisting of oxygen and amine. Hence, in a particular embodiment $R^2$ is selected from the group consisting of formula VII and VIII:

(VII)

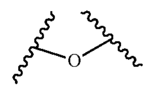

(VIII)

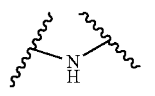

In an embodiment, n is 0 or 1.

In an embodiment, $R^3$ is selected from the group consisting of formula IX to XIV:

(IX)

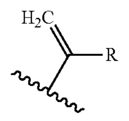

(X)

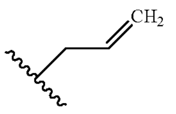

(XI)

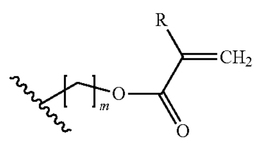

(XII)

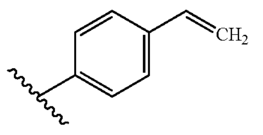

(XIII)

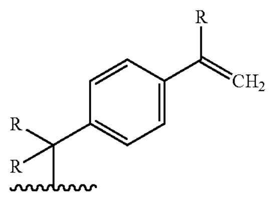

(XIV)

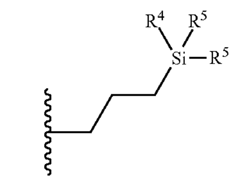

In an embodiment, R is independently H or alkyl, preferably a C1 to C6 alkyl, and more preferably a C1 to C4 alkyl. In a particular embodiment, R is independently H, methyl or ethyl, preferably H or methyl. In an embodiment, $R^4$, $R^5$ and $R^6$ are independently alkoxy, preferably a C1 to C6 alkoxy, and more preferably a C1 to C4 alkoxy. In a particular embodiment, $R^4$, $R^5$ and $R^6$ are independently methoxy, ethoxy or propoxy. In an embodiment, m is 0, 1, 2 or 3

In an embodiment, the monomer comprising medetomidine, or the enantiomer, base or salt thereof, is selected from the group consisting of a medetomidine methacrylate, such as 1-{4-[1-(2,3-dimethylphenyl)ethyl]-1H-imidazol-1-yl}-2-methylprop-2-en-1-one (M1) or 1-{5-[1-(2,3-dimethylphenyl)ethyl]-1H-imidazol-1-yl}-2-methylprop-2-en-1-one, 2-({4-[1-(2,3-dimethylphenyl)ethyl]-1H-imidazole-1-carbonyl}amino)ethyl 2-methylprop-2-enoate (M6) or 2-({5-[1-(2,3-dimethylphenyl)ethyl]-1H-imidazole-1-carbonyl}amino)ethyl 2-methylprop-2-enoate; an allylsulfonyl medetomidine, such as 4-[1-(2,3-dimethylphenyl)ethyl]-1-(prop-2-ene-1-sulfonyl)-1H-imidazole (M2) or 5-[1-(2,3-dimethylphenyl)ethyl]-1-(prop-2-ene-1-sulfonyl)-1H-imidazole; an allyl medetomidine, such as prop-2-en-1-yl 4-[1-(2,3-dimethylphenyl)ethyl]-1H-imidazole-1-carboxylate (M3) or prop-2-en-1-yl 5-[1-(2,3-dimethylphenyl)ethyl]-1H-imidazole-1-carboxylate, 4-[1-(2,3-dimethylphenyl)ethyl]-N-(prop-2-en-1-yl)-1H-imidazole-1-carboxamide (M4) or 5-[1-(2,3-dimethylphenyl)ethyl]-N-(prop-2-en-1-yl)-$^1$H-imidazole-1-carboxamide; a medetomidine acrylate, such as 2-({4-[1-(2,3-dimethylphenyl)ethyl]-1H-imidazole-1-carbonyl}amino)ethyl prop-2-enoate (M5) or 2-({5-[1-(2,3-dimethylphenyl)ethyl]-$^1$H-imidazole-1-carbonyl}amino)ethyl prop-2-enoate; and a silyl medetomidine, such as 2-({4-[1-(2,3-dimethylphenyl)ethyl]-1H-imidazole-1-carbonyl}amino)ethyl prop-2-enoate (M10) or 2-({5-[1-(2,3-dimethylphenyl)ethyl]-1H-imidazole-1-carbonyl}amino)ethyl prop-2-enoate, 3-(4-[1-(2,3-dimethylphenyl)ethyl]-1H-imidazole-1-dimethylsilyl)propyl 2-methylprop-2-enoate (M11) or 3-(5-[1-(2,3-dimethylphenyl)ethyl]-1H-imidazole-1-dimethylsilyl) propyl 2-methylprop-2-enoate.

The present invention also relates to an antifouling composition comprising a polymer according to the embodiments and/or a monomer according to the embodiments and a solvent.

In an embodiment, the antifouling composition comprises the antifouling polymer comprising a plurality of repeating units, of which at least a portion comprises medetomidine, or the enantiomer, base or salt thereof, covalently bound to the repeating unit through a hydrolysable bond and the solvent.

In another embodiment, the antifouling composition may comprise, in addition to the antifouling polymer and the solvent, also monomers of which at least a portion thereof comprises medetomidine, or the enantiomer, base or salt thereof, covalently bound to the monomer through a hydrolysable bond. Hence, in this embodiment, the antifouling composition also comprises non-polymerized monomers that may carry medetomidine.

In an embodiment, the antifouling composition may also comprise free medetomidine, or the enantiomer, base or salt thereof, not covalently bound to any monomer or repeating unit.

In an embodiment, the solvent is selected from the group consisting of xylene, toluene, 1-methoxy-2-propanol, 1-methoxy-2-propanoyl acetate, methyl isobutyl ketone, solvent naphtha and a mixture thereof.

The antifouling composition may optionally comprise other ingredients including, but not limited to, one or more pigments, such as $Cu_2O$, ZnO, $TiO_2$ and/or an iron oxide ($Fe_xO_y$), one or more fillers or extenders, such as talc, $CaCO_3$, $BaSO_4$ and/or mica (phyllosilicates), one or more rheology modifiers, such as fumed silica, silica and/or clay, and/or one or more biocides.

In an embodiment, at least one other biocide other than medetomidine is included in the antifouling composition. This at least one other biocide could be an antifouling agent, an algicide, a fungicide, a herbicide or a combination thereof.

Non-limiting, but illustrative examples of such biocides other than medetomidine that can be used according to the embodiments are listed in WO 2012/175469 on page 11, line 16 to page 12, line 10 and in WO 2013/182641 on page 10, line 22 to page 13, line 2, the teaching of which is hereby incorporated by reference with regard to biocides that can be used according to the embodiments.

Other non-limiting biocides that can be used according to the embodiments include, but are not limited to, chlorothalonil (2,4,5,6-tetrachlorobenzene-1,3-dicarbonitrile), dichlofluanid (N-{[dichloro(fluoro)methyl]sulfanyl}-N',N'-dimethyl-N-phenylsulfuric diamide), DCOIT (4,5-dichloro-2-n-octyl-4-isothiazolin-3-one), cybutryne (2-N-tert-butyl-4-N-cyclopropyl-6-methylsulfanyl-1,3,5-triazine-2,4-diamine), DCMU (3-(3,4-dichlorophenyl)-1,1-dimethylurea), tolylfluanid (N-[dichloro(fluoro)methyl]sulfanyl-N-(dimethylsulfamoyl)-4-methylaniline), zinc pyrithione (bis(2-pyridylthio)zinc 1,1'-dioxide), copper pyrithione (bis(2-pyridylthio)copper 1,1'-dioxide), cybutryne (2-N-tert-butyl-4-N-cyclopropyl-6-methylsulfanyl-1,3,5-triazine-2,4-diamine), zinc ethane-1,2-diylbis(dithiocarbamate), zinc bis (dimethylthiocarbamates, manganese ethylene-1,2-bisdithiocarbamate polymer, 4-bromo-2-(4-chlorophenyl)-5-(trifluoromethyl)-1H-pyrrole-3-carbonitrile (tralopyril), and a mixture thereof.

Medetomidine has specific actions against hard fouling, in particular barnacle cyprids, but typically no effect on algal growth. Accordingly, at least one other biocide, such as an algicide, could be used to prevent algal growth as well.

The antifouling composition, polymer and monomers according to the invention can be included in a surface coating, such an antifouling coating, an antifouling film or an antifouling paint, of an article, such as an underwater or submersible device or structure. The antifouling composition could then be regarded as an antifouling coating composition or formulation, an antifouling film composition or formulation, or an antifouling paint composition or formulation. Hence, the article comprises a surface coating with a polymer according to the invention, a monomer according to the invention and/or an antifouling composition according to the invention on at least a portion of a surface of the article designed or configured to be submersed in water to inhibit marine biofouling of the surface.

For instance, the antifouling composition or polymer could be applied as a coating, film or paint on the underwater or submersible device or structure, such as in the form of a spray coating, film or paint.

The article could be a propeller tunnel, a guide vane, a fender, mooring equipment, underwater rope, underwater wire, underwater net, ship or boat hull etc. as illustrative but non-limiting examples.

Figure 8:
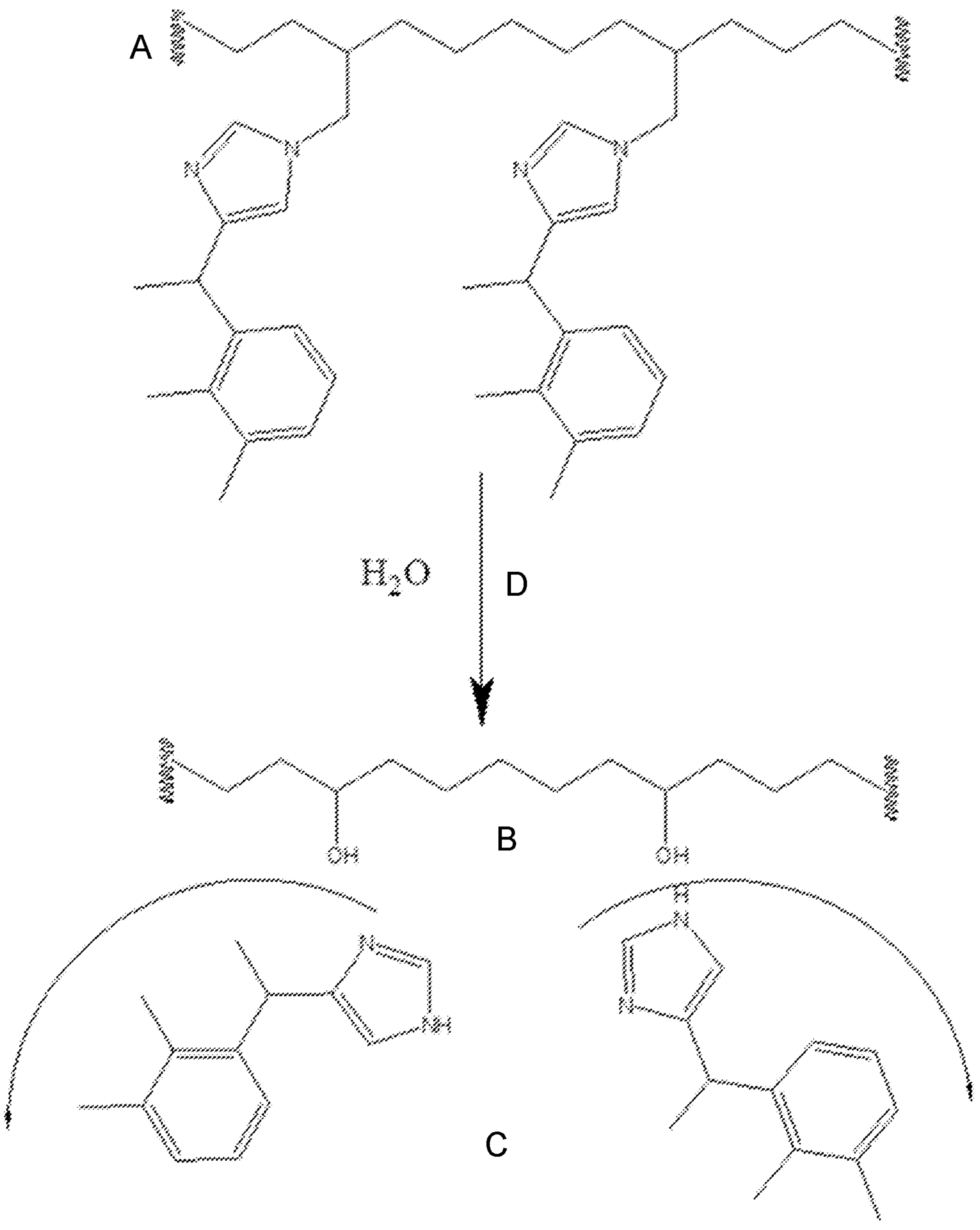
FIG. 8 schematically illustrates a medetomidine containing polymer and its hydrolysis to release free medetomidine. A: polymer, copolymer (binder or polymeric particle) with medetomidine covalently bound to the polymer; B: water soluble polymer; C: free medetomidine ready to act as antifoulant; D: In contact with water hydrolysis takes place and free medetomidine is released. The same process is making the polymer residue more water soluble, which in turn helps the surface to polish and refresh.

When the surface coating of the article is submersed and come in contact with water the covalent bond between medetomidine and repeating units in the polymer and/or between medetomidine and free monomer units in the surface coating is hydrolyzed to thereby release medetomidine from the surface coating, see FIG. 8. The free medetomidine can then act as an antifouling agent and inhibit marine biofouling on the submersed surface of the article.

The release rate of medetomidine can be controlled in various ways including the concentration of the antifouling polymer in the surface coating. A higher concentration of the antifouling polymer generally leads to a higher release rate of medetomidine and a prolonged medetomidine release. Furthermore, the proportion of medetomidine carrying repeating units in the antifouling polymer affects the release rate of medetomidine form the surface coating. Hence, a higher percentage of medetomidine carrying repeating units in the antifouling polymer generally leads to a higher release rate of medetomidine and a prolonged medetomidine release. Furthermore, by using different types of medetomidine carrying repeating units in the antifouling polymer, the release rate of medetomidine from the surface coating can be controlled and tailored to meet a target release rate. In addition, the release of medetomidine from the antifouling polymer depends on the hydrophilicity or hydrophobicity of the antifouling polymer and of a paint film comprising the antifouling polymer.

A free medetomidine molecule will diffuse freely through a surface coating interacting with other coating constituents depending on the formula. This may cause the surface coating to be depleted of medetomidine too fast and reduce the antifouling lifetime of the surface coating. Attaching medetomidine to a polymeric or monomeric carrier will reduce this risk and, in addition, enables control of the release or leaching rate. Furthermore, covalently attaching medetomidine to repeating units in the antifouling polymer will more evenly disperse medetomidine in the antifouling composition during the formulation phase.

In certain antifouling compositions, it may not be possible to add medetomidine directly due to incompatibility. For instance, a solvent for medetomidine may not be compatible with at least some of the other ingredients in the antifouling composition.

Furthermore, by attaching medetomidine to repeating units in a polymer, the polymer can act as a carrier of the antifouling agent. The polymer can then either be used as the binder, such as alone or in combination with other polymers, in the antifouling composition or as a carrier particle immobilizing medetomidine in the surface coating until needed. Furthermore, when the surface coating is in contact with water, the water will penetrate into the surface coating and trigger hydrolysis to release medetomidine. At the same time, the polymers are made more water soluble, which in turn polishes and refreshes the surface coating.

The antifouling polymers of the invention can act as metal free carriers of medetomidine thereby preventing the release of zinc and copper to water as compared to previously used metal oxide based carriers. Hence, the antifouling composition of the invention can be in the form of a zinc and copper free composition.

Attaching medetomidine to repeating units of an antifouling polymer furthermore inhibits the problems associated of certain binder systems, such as silyl acrylates, being sensitive to free medetomidine molecules causing undesired gelation.

A further aspect of the invention relates to a method of producing a medetomidine monomer. The method comprises reacting a polymerizable monomer comprising an electrophilic site with medetomidine, or an enantiomer, base or salt thereof, to covalently bind medetomidine, or the enantiomer, base or salt thereof, to the monomer through a hydrolysable bond formed between the electrophilic site and a nitrogen on the imidazole ring of medetomidine, or the enantiomer, base or salt thereof.

In an embodiment, the method further comprises dissolving medetomidine, or the enantiomer, base or salt thereof, in a solvent to form a medetomidine solution and adding the polymerizable monomer to the medetomidine solution.

In a particular embodiment, medetomidine, or the enantiomer, base or salt thereof, and diisopropylethylamine are dissolved in dichloromethane to form the medetomidine solution. In this particular embodiment, allyl chloroformate is added as polymerizable monomer to the medetomidine solution.

In another particular embodiment, medetomidine, or the enantiomer, base or salt thereof, and optionally pyridine are dissolved in dichloromethane to form the medetomidine solution. In this particular embodiment, allyl isocyanate is added as polymerizable monomer to the medetomidine solution.

In a further particular embodiment, medetomidine, or the enantiomer, base or salt thereof, and trimethylamine are dissolved in dichloromethane to form the medetomidine solution. In this particular embodiment, 2-propenylsulfonyl chloride is added as polymerizable monomer to the medetomidine solution.

In another particular embodiment, medetomidine, or the enantiomer, base or salt thereof, and N,N-dimethyl-4-aminopyridine are dissolved in dichloromethane to form the medetomidine solution. In this particular embodiment, methacrylic anhydride or methacryloyl chloride is added as polymerizable monomer to the medetomidine solution.

In a further particular embodiment, medetomidine, or the enantiomer, base or salt thereof, is dissolved in dichloromethane to form the medetomidine solution. In an optional embodiment, pyridine may be added as catalyst to the medetomidine solution. In this particular embodiment, isocyantoethyl methacrylate is added as polymerizable monomer to the medetomidine solution.

In yet another particular embodiment, medetomidine, or the enantiomer, base or salt thereof, is dissolved in dichloromethane to form the medetomidine solution. In an optional embodiment, pyridine may be added as catalyst to the medetomidine solution. In this particular embodiment, isocyantoethyl acrylate is added as polymerizable monomer to the medetomidine solution.

In the above described particular, any of dichloromethane, pyridine and xylene, if any, could be used as solvent.

Yet another aspect of the invention relates to a method of producing an antifouling polymer. The method comprises polymerizing monomers comprising medetomidine, or an enantiomer, base or salt thereof, covalently bound to the monomer through a hydrolysable bond and optionally monomers lacking medetomidine, or an enantiomer, base or salt thereof, to form an antifouling polymer comprising a plurality of repeating units derived from monomers, wherein at least a portion of the plurality of repeating units comprises medetomidine, or the enantiomer, base or salt thereof, covalently bound to the repeating unit through a hydrolysable bond.

A further aspect of the invention relates to a method of producing an antifouling polymer. The method comprises covalently binding medetomidine, or an enantiomer, base or salt thereof, to a polymer comprising a plurality of repeating units so that at least a portion of the plurality of repeating units comprises medetomidine, or the enantiomer, base or salt thereof, covalently bound to the repeating unit through a hydrolysable bond.

EXAMPLES

Example 1

A set of monomers were designed based on couplings of a polymerizable part to the imidazole of medetomidine. The hydrolysable connection between the medetomidine and the polymerizable part of the molecule is made up from one of following bonds/functional groups: amide bonds, sulfonamide, urea or carbamate. In the beginning pyridine, DMAP and/or $Et_3N$ was used as catalyst in the reactions but it was discovered that a catalyst was often not needed.

Preparation of 1-{4-[1-(2,3-dimethylphenyl)ethyl]-1H-imidazol-1-yl}-2-methylprop-2-en-1-one (M1)

Compound M1 was prepared from acylation of the imidazole and a range of acylating agents and reaction were investigated. Both methacrylic anhydride and methacryloyl chloride afforded M1 as shown in FIG. 1.

Methacrylic anhydride or methacryloyl chloride (1.12 mL, 7.5 mmol, 1.5 equiv.) was added dropwise to a solution of medetomidine (I) (1 g, 5.0 mmol, 1.0 equiv.) and N,N-dimethyl-4-aminopyridine (DMAP; 0.061 g, 0.5 mmol, 10 mol %) in anhydrous dichloromethane (DCM; 10 mL) and the reaction mixture was stirred at room temperature for 24 h. The resulting mixture was washed twice with saturated sodium bicarbonate and then subjected to flash column chromatography on silica gel using petroleum ether:acetone (8:2) as eluent to afford the acylated medetomidine M1 as a colorless liquid. $^1H$ NMR (500 MHz, Chloroform-d): δ 8.00 (d, J=1.4 Hz, 1H), 7.27 (s, 1H), 7.13-7.10 (m, 1H), 7.10-7.02 (m, 3H), 5.83 (d, J=1.6 Hz, 1H), 5.64 (d, J=1.4 Hz, 1H), 4.39 (q, J=8.1, 7.2 Hz, 1H), 2.30 (s, 3H), 2.27 (s, 3H), 2.11 (s, 3H), 1.60 (d, J=7.1 Hz, 3H). $^{13}C$ NMR (126 MHz, Chloroform-d): δ 166.75, 149.61, 142.24, 138.37, 137.49, 136.90, 134.20, 128.15, 125.58, 125.38, 124.37, 113.07, 35.12, 21.06, 20.42, 19.47, 14.96. The yield with metacryloyl chloride was 69%, whereas the yield using methacrylic anhydride was lower.

The syntheses as shown in FIG. 1 were also repeated using N,N'-dicyclohexylcarbodiimide (DCC) as coupling reagent instead of DMAP resulting in substantially the same yield of M1.

Preparation of 4-[1-(2,3-dimethylphenyl)ethyl]-1-(prop-2-ene-1-sulfonyl)-1H-imidazole (M2)

Medetomidine (200 mg, 1 mmol) and triethylamine (202 mg, 2 mmol) were dissolved in dichloromethane (10 ml) at −78° C. After 30 min at −78° C., 2-propenylsulfonyl chloride was added and the reaction was stirred 4 hours at −78° C. Hydrogen chloride (1 M) and diethyl ether were added. The organic layer was dried ($Na_2SO_4$), filtered through celite and solvent was evaporated. Crude amount 259 mg. NMR showed presence of two regioisomers and other impurities. This indicates production of two polymerizable monomers comprising medetomidine bound to the propenylsulfonyl via either of the two imidazole nitrogens. FIG. 1 illustrates the reaction scheme for producing one of the present polymerizable monomers comprising medetomidine.

Preparation of prop-2-en-1-yl 4-[1-(2,3-dimethylphenyl)ethyl]-1H-imidazole-1-carboxylate (M3)

Figure 2:
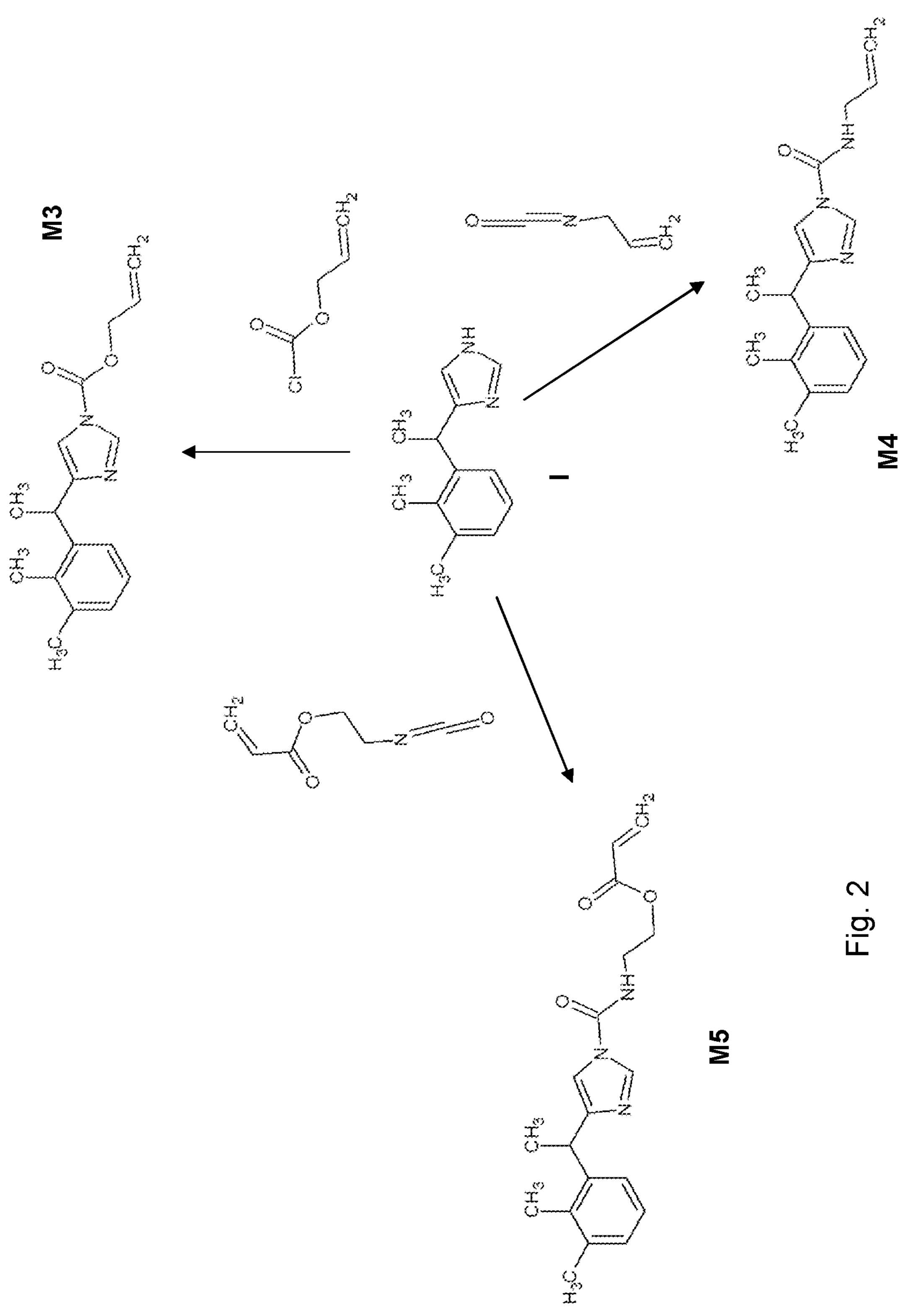
FIG. 2 illustrates a reaction scheme for the production of prop-2-en-1-yl 4-[(2,3-dimethylphenyl]-1H-imidazole-1-carboxylate (M3), 4-[(2,3-dimethylphenyl)ethyl]-N-(prop-2-en-1-yl)-1H-imidazole-1-carboxamide (M4) and 2-({4-[1-(2,3-dimethylphenyl)ethyl]-1H-imidazole-1-carbonyl}amino)ethyl prop-2-enoate (M5) according to an embodiment.

Medetomidine (200 mg, 1 mmol) and diisopropylethylamine (194 mg, 1.5 mmol) were dissolved in dichloromethane (10 ml) at −78° C. Allyl chloroformate was added and the solution was stirred 3 h at −78° C. Water and diethylether were added. The organic layer was dried ($Na_2SO_4$), filtered through celite and solvent was evaporated. Crude amount 240 mg, yield 85%. $^1H$-NMR ($CDCl_3$): 1.59 (d, 3H), 2.25 (s, 3H), 2.30 (s, 3H), 4.37 (q, 1H), 4.84 (d, 2H), 5.36 (dd, 1H), 5.43 (dd, 1H), 5.99 (m, 1H), 6.99 (d, 1H), 7.02-7.09 (b, 3H), 8.08 (d, 1H). FIG. 2 illustrates the reaction scheme for producing the present polymerizable monomer comprising medetomidine.

Preparation of 4-[1-(2,3-dimethylphenyl)ethyl]-N-(prop-2-en-1-yl)-1H-imidazole-1-carboxamide (M4)— synthesis I Medetomidine (200 mg, 1 mmol) and allyl isocyanate (88 ml, 1 mmol) were added to dichloromethane at room temperature (20-25° C.). The reaction was stirred 3 hours. Water and diethylether were added. The organic layer was dried ($Na_2SO_4$), filtered through celite and solvent was evaporated. Crude amount 280 mg, yield 99%. $^1H$-NMR ($CDCl_3$): 1.50 (d, 3H), 2.14 (s, 3H), 2.25 (s, 3H), 3.75 (m, 2H), 4.26 (q, 1H), 5.08 (d, 1H), 5.14 (d, 1H), 5.75 (m, 1H), 6.89-7.01 (m, 3H), 7.14 (b, 1H), 8.05 (b, 1H). FIG. 2 illustrates the reaction scheme for producing the present polymerizable monomer comprising medetomidine.

Preparation of 4-[1-(2,3-dimethylphenyl)ethyl]-N-(prop-2-en-1-yl)-1H-imidazole-1-carboxamide (M4)— synthesis II Allyl medetomidine M4 was prepared from I and allyl isocyanate according to the reaction scheme illustrated in FIG. 2.

Allyl isocyanate (1.91 mL, 21.6 mmol, 2.94 equiv.) was added in three portions to a solution of 1(1.47 g, 7.36 mmol, 1.0 equiv.) and pyridine (1.8 mL, 22.3 mmol, 3.04 equiv.) in anhydrous dichloromethane (7.5 mL). The reaction mixture was stirred at room temperature for 24 h. The solvent was removed by rotary evaporation at reduced pressure. The crude was re-dissolved in toluene and the solvent was once more removed at reduced pressure. The crude was dissolved in ethyl acetate and subjected to flash column chromatography on silica gel using ethyl acetate/heptane (1:1) to ethyl acetate as eluent to afford pure (determined via LC-MS and TLC analysis) allyl medetomidine M4. Following solvent removal, the purified M4 was dissolved in acetonitrile/$H_2O$ (1:1) and lyophilized to yield 1.96 g (94%) of pure crystalline M4.

Preparation of 2-({4-[1-(2,3-dimethylphenyl)ethyl]-1H-imidazole-1-carbonyl}amino)ethyl prop-2-enoate (M5) and 2-({4-[1-(2,3-dimethylphenyl)ethyl]-1H-imidazole-1-carbonyl}amino)ethyl 2-methylprop-2-enoate (M6)

Several reactions/preparations were done and they will be referred to with a R followed by a number as indicator following the corresponding monomer M5 or M6. In an initial synthesis, pyridine was used as a catalyst to aid in the conjugation reaction of an isocyanate with medetomidine. Isocyanatoethyl methacrylate (IEM) or isocyanatoethyl acrylate (IEA) was combined with medetomidine at 5% molar excess, see FIGS. 2 and 3. In the initial synthesis, pyridine was added at threefold the molar quantity of medetomidine. In subsequent syntheses, pyridine was reduced to an equimolar ratio with medetomidine or eliminated. This reduction or elimination of pyridine simplifies subsequent purification.

Table 1 provides a summary of molar ratios and reaction times for the various syntheses.

TABLE 1

Summary of molar ratios and reaction times

| | Medetomidine | Pyridine | IEM or IEA* | DCM (g:mL) | Reaction time (h) |
|---|---|---|---|---|---|
| M6R1 | 1 | 3 | 1.05 | 5 | 4.5 |
| M6R2 | 1 | 3 | 1.05 | 5 | 4.5 |
| M6R3 | 1 | 0 | 1.05 | 5 | 72 |
| M6R4 | 1 | 3 | 1.05 | 5 | 4.5 |
| M6R5 | 1 | 1 | 1.05 | 5 | 24 |
| M6R6 | 1 | 0 | 1.05 | 5 | 44 |
| M5R1 | 1 | 0 | 1.05 | 6 | 24 |

*IEM was used as isocyanate in M6R1-M6R6 and IEA was used as isocyanate in M5R1

Synthesis protocol for M6R1, M6R2 and M6R4

A 100 mL 3-necked round bottom flask was immersed in a temperature regulated oil bath. On its leftmost neck, nitrogen gas was flown in. In its middle neck, a glass stopper was placed where it could be removed and replaced in order to take samples of the reaction at different times. On its rightmost neck, a condenser with cold running water as coolant was placed to prevent runoff of the dichloromethane (DCM) solvent.

Medetomidine (M6R1: 5.0781 g; M6R2: 5.3057 g; M6R4: 5.03225 g) was first dissolved in 25 mL DCM. 6.03 mL pyridine, acting as catalyst, was then introduced into the medetomidine solution. 3.71 mL IEM was next added dropwise, with an exothermic reaction being noticeable from the increase in the thermocouple sensor going above the set temperature. The reaction was run for 4.5 h as the isocyanate peak has been found to be greatly reduced from a Fourier-transform infrared spectroscopy (FTIR) reading at 4 h.

Purification

In the second preparation of M4 above, the medetomidine conjugated allyl isocyanate was purified by dissolving the crude mixture in toluene and co-evaporating the pyridine from the mixture in a rotary evaporator in room temperature. This procedure was followed for M6R1, M6R2, M6R4.

The next step was to use a flash chromatography column to separate the unreacted medetomidine and isocyanate from the adduct. The original protocol used a gradient of ethyl acetate and heptane, first dissolving the product in a 50:50 blend. M6R1 immediately precipitated and formed a solid chunk where it was previously a sticky liquid mixture with some toluene. M6R2 and M6R4 were stored without flash chromatography purification.

M6R2 and M6R4 were stored and used in chemical characterization and release studies without further purification to prevent unwanted precipitation/crosslinking of unreacted isocyatate chains.

M6R5 Synthesis

Medetomidine (5.03830 g) was added in 25 mL DCM for dissolution in a 100 mL 3-neck round bottom flask. Pyridine (2.01 mL) was added. The starting temperature in the oil bath was 31.7° C. IEM (3.71 mL) was added by 200 μL stages. The synthesis was run for 24 hours. The following day, the reaction mixture was used directly for CP6R1 polymerization.

M6R3 and M6R6 synthesis

From HPLC analysis of M6R4, the reaction was determined to have a 90±2% efficiency. In order to reduce time spent on the removal of pyridine, synthesis of M6R3, M6R6, and M10R1 were attempted without pyridine.

Medetomidine (M6R3: 1.0013 g; M6R6: 4.02450 g) was first dissolved in the DCM solvent (M6R3: 5 mL; M6R6: 20.53 mL) within the reaction flask. IEM was then added dropwise and the flask was sealed. Samples were taken at different time intervals to monitor the extent of reaction. The synthesis was run for much longer (see Table 6) in order to allow sufficient time for the addition reaction to take place.

M5R1 Synthesis

Medetomidine (5.03104 g) was added in 30 mL DCM for dissolution in a 100 mL 3-neck round bottom flask. The starting temperature in the oil bath was 31.7° C. IEA (3.36 mL) was added by 200 μL stages.

M5R1 was precipitated in heptane. Previous observations of M6 showed that keeping the monomer in room temperature to thaw for use renders it insoluble to acetone and solvents, in which it was previously soluble. However this was not the case with M5R1. The monomer/heptane slurry was placed in a fume hood to evaporate out the remaining organic solvent for two days. Acetone was added to resolubilize and the M5R1 monomer was successfully re-dissolved.

Preparation of 4-[1-(2,3-dimethylphenyl)ethyl]-1-(methanesulfonyl)-1H-imidazole (M0)

Medetomidine (200 mg, 1 mmol) and triethylamine (152 mg, 1.5 mmol) were added to dichloromethane (10 ml) at −78° C. After 30 min methane sulfonyl chloride was added at −78° C. The reaction mixture was stirred 3 hours at −78° C. Diethyl ether and water were added. The organic layer was dried ($Na_2SO_4$), filtered through celite and solvent was evaporated. Amount 270 mg, yield 97%. NMR showed two regioisomers in a ratio of 1:1. This indicates production of two polymerizable monomers comprising medetomidine bound to the propenylsulfonyl via either of the two imidazole nitrogens. FIG. 1 illustrates the reaction scheme for producing this medetomidine containing sulfonamide compound M0.

Example 2

The stability/hydrolysis rate of the monomer were tested in two setups described below Setup 1

The stability of the carbamate-(M3), urea-(M4) and sulfonylderivative of medetomidine (M2 and M0) were studied in ethanol and phosphate-buffered saline (PBS) buffer. Thin-layer chromatography (TLC) was used to follow the decomposition of the derivatives to free medetomidine. It took approximately two weeks until most of the derivatives stored at room temperature to decompose. If the storage temperature was +6° C. no decomposition was observed.

Materials and Methods

Nine vials were prepared. Vial 1 contained reference compound medetomidine dissolved in ethanol (1 ml). Substance M2 (25 mg) was added to vial 2 and 3. Substance M3 (25 mg) was added to vial 4 and 5. Substance M4 (25 mg) was added to vial 6 and 7 and substance M0 was added to vial 8 and 9. The solid material in vials 2 to 9 were dissolved in ethanol (1 ml) and PBS buffer pH 7.4 (1 ml) to mimic sea water containing different salts and having a pH slightly basic. Ethanol was chosen as solvent to increase the solubility of the substances. During the study vial 1, 3, 5, 7 and 9 were stored at room temperature, whereas vial 2, 4, 6 and 8 were stored in a refrigerator at +6° C. Stability of the compounds was studied after 0, 1, 2, 5, 6, 9, 13 and 15 days using TLC and dichloromethane—methanol (95-5) as eluent.

Results

Sample M2 had a Rf value of ≈0.6, sample M3 had a Rf value of ≈0.8, sample M4 had a Rf value of 0.55-0.60 and sample M0 had a Rf value of 0.7. Medetomidine had a Rf value of 0.1. After day 2, only the starting materials (monomers comprising medetomidine) were visible in all vials indicating that no decomposition had taken place. After one week, decomposition of the derivatives was more visible, mainly in the vials stored at room temperature. After two weeks, sample M2 showed only medetomidine from the vial stored at room temperature, while the vial stored in the refrigerator showed a mixture of medetomidine and the starting material. Sample M3 showed only medetomidine from the vial stored in room temperature, while the other vial stored in the refrigerator showed a mixture of medetomidine and the starting material. Samples M2 and M3 seemed to be very similar in stability. Sample M4 was stable when stored in the refrigerator after two weeks, but the vial stored at room temperature showed decomposition to medetomidine as well as non-hydrolyzed M4. Sample M0 was stable in room temperature and in the refrigerator after two weeks. The results from the stability experiment indicated that the urea derivative was the most stable and the carbamate derivative was the least stable. The stability of the sulfonamide derivatives was very dependent on the size of the alkyl group.

Setup 2

Materials and Methods

The stability of M1 and M4 was evaluated via quantification of the release of I into artificial seawater (3% NaCl, pH 8.0). For the experiments, compound M1 (0.023 g) was suspended in 5 mL artificial seawater, while M4 (0.044 g) were suspended in 10 mL artificial seawater. The solutions were stirred (300 rpm) at ambient temperatures and samples were collected at 10, 15, 20 and 25 days. The samples were stored in freezer 2-2.5 months prior to LC-MS analysis.

LC-MS analysis

Samples from the release studies were analyzed using LC-MS. The LC-MS system was composed of an Acquity I-class UPLC with a Waters Xevo G2-S Qtof. The chromatographic separation was obtained on a C18 column with gradient elution (Eluent A, 0.1% $NH_4$ in MQ-water and Eluent B, 100% acetonitrile). The samples (from freezer) were extracted with hexane and the organic extracts were analyzed by LC-MS. Three external calibration curves for I, M1 and M4 were prepared the same way as the samples and used for quantification.

Both the stability of the monomers in artificial seawater and the potential release of I were studied and quantified employing LC-MS as summarized in Table 2.

TABLE 2

Concentration of I (ng/mL) released from M1 and M4

| Compound | Incubation time (days) | | | |
|---|---|---|---|---|
| | 10 | 15 | 20 | 25 |
| M1 | 9330.0 | 9905.8 | 9748.8 | 9820.4 |
| M4 | 5028.9 | 5592.2 | 5078.0 | —* |

*No result due to technical problem during analysis.

All samples from the stability studies of compounds M1 and M4 yielded a near constant amount of I. This suggest either a rapid hydrolysis taking place prior to the first data point at day 10 or a contamination of I present in the monomer preparation. The concentration was ~9 μg/mL for M1 and ~5 μg/mL for M4. A complete hydrolysis of the two monomers would yield a concentration of 3.3 mg/mL for I, which may be indicative of a low residual contamination of unreacted I from the synthesis of M1 and M4. Being present at a concentration of between 0.16-0.27% in the monomer samples, such a small contamination would not be readily detectable with either NMR or LC-MS and it is possible that the I detected from the monomer stability studies indeed is a contamination. A low degree of hydrolysis during sample storage (freezer) cannot be ruled out either.

Example 3

Polymerization of monomers both as homopolymers and as co-polymers was done followed by characterization as described below.

Polymers from M1 and M4 were prepared using radical polymerization initiated by UV-irradiation according to Analytica Chimica Acta 2001, 435: 19-24 and the general method for polymerization is as follows.

Homopolymerization of M1 and M4

Homopolymers of M1 and M4 was further prepared to evaluate the reactivity of the individual monomers. For the preparation of homopolymers, M1 and M4 (0.26 g) were dissolved in $CHCl_3$ (2 mL) and azobis isobutyronitrile (AIBN) (0.026 g) was added. The solution was purged with $N_2$ (g) for 5 min and placed in the UV-cabinet where it was cured for initial 24 h. Inspection after 24 h indicated a low degree of polymerization (clear, non-viscous solution) and polymerization was therefore continued for an additional 24 h. The experiment was terminated after 48 h and the resultant viscous solution was left to dry at ambient temperature to remove the solvent.

Co-polymerization of M1 and M4 together with MMA and EGDMA

Figures 4, 5:
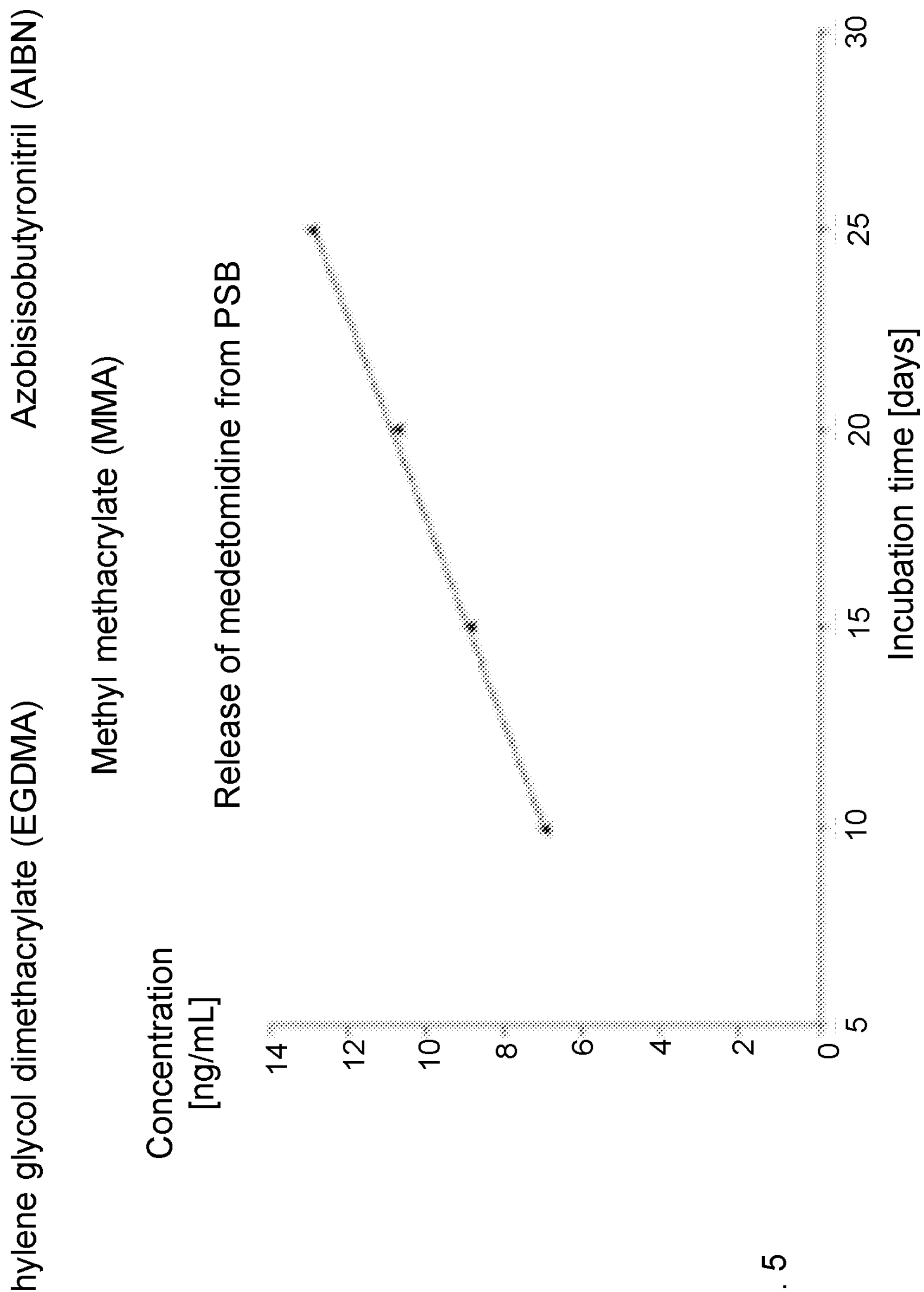
FIG. 4 illustrates structures of methyl methacrylate (MMA), ethylene glycol dimethacrylate (EGDMA) and azobisisobutyronitrile (AIBN) used to produce co-polymers according to various embodiments.
FIG. 5 is a diagram illustrating time dependent release of medetomidine from polystyrene medetomidine (PSB).

Co-polymers of M1 and M4 were prepared with methyl methacrylate (MMA) and the crosslinker ethylene glycol dimethacrylate (EGDMA) employing AIBN as free radical polymerization initiator as illustrated in FIG. 4.

1.32 mL (7 mmol) and 745 μL MMA (7 mmol) were dissolved in $CHCl_3$ (5 mL) in a 20 mL glass scintillation vial. 89 mg of M4 and AIBN (24 mg, 0.15 mmol) were added to the solution, which was subsequently purged with $N_2$ (g) for 5 min to remove oxygen from the reaction vessel. The vessel was sealed and placed in a UV-cabinet at room temperature for 24 h to cure at 365 nm, which yielded a solid white polymer monolith inside the vial.

Following the polymerization, the solid polymer monolith was washed with acetone (10 mL, discarded), crushed with a mortar and pestle (in an acetone slurry) and passed through a sieve (60 μm) to generate a homogenous polymer particle distribution for the release studies. The polymer particles were sedimented from acetone (discarded) and dried at room temperature prior to further studies.

Polymers prepared with only MMA as co-polymers did not form solid polymers but instead transparent gels due to the lack of a crosslinking monomer. These polymers were also washed with acetone prior to analysis.

A range of polymers with ranging compositions of EGDMA and MMA and with compounds I, M1 and M4 (only incorporated one at a time and not in combination) incorporated were prepared according to Table 3.

TABLE 3

| Polymer composition ratios | | | | | | | | | |
|---|---|---|---|---|---|---|---|---|---|
| | EGDMA:MMA 1:0 (molar ratio) | | | EGDMA:MMA 0.5:0.5 (molar ratio) | | | EGDMA:MMA 0:1 (molar ratio) | | |
| | Amount (mmol) | Mass (g) | Volume (μL) | Amount (mmol) | Mass (g) | Volume (μL) | Amount (mmol) | Mass (g) | Volume (μL) |
| EGDMA | 10.5 | 2.076 | 1977 | 7.0 | 1.388 | 1321 | 0 | 0 | 0 |
| MMA | 0 | 0 | 0 | 7.0 | 0.701 | 745 | 21.0 | 2.098 | 2231 |
| AIBN | 0.15 | 0.024 | | 0.15 | 0.024 | | 0.15 | 0.024 | |
| $CHCl_3$ (mL) | | | 5000 | | | 5000 | | | 5000 |
| I | 0.3 | 0.062 | | 0.3 | 0.063 | | 0.3 | 0.063 | |
| M1 | 0.3 | 0.084 | | 0.3 | 0.084 | | 0.3 | 0.084 | |
| M4 | 0.3 | 0.089 | | 0.3 | 0.089 | | 0.4 | 0.089 | |

Polymers incorporating ~0.3% of the monomers M1 and M4 were also prepared according to the ratios summarized in Table 1. In addition, polymers incorporating 10% of M4 were also prepared using the composition for the neat EGDMA polymers.

Polymer Characterization

The prepared polymers were characterized with FTIR in an attempt to quantify the covalent incorporation of M1 and M4 in the copolymers. The reference spectra of the monomers and I were compared to the IR-spectra of the ground and washed polymers. Polymers prepared with 10% M4 were also analyzed using FTIR.

Monomers M1 and M4 were incorporated at molar ratios ranging between 0.3-10% in different copolymer systems together with EGDMA and MMA. Visually the polymerization reactions appeared successful as shown and the material was used for release studies. In parallel, the polymers were evaluated using FTIR. Both M1 and M4 also displayed strong carbonyl signals at ~1750 $cm^{-1}$, which unfortunately overlapped with the carbonyl signals of both EGDMA and MMA making the use of that signal ambiguous for assessment of monomer incorporation.

Attempts to increase the ratio of M4 were performed by incorporating it at a higher molar ratio. However, the results suggest that the degree of polymer integration is the same for the "3%" and the "10%" polymers.

Ninhydrin Testing

The staining of primary and secondary amines by the use of ninhydrin was also employed on the prepared polymers in an attempt to evaluate the presence of covalently incorporated medetomidine monomers. Ninhydrin solution was prepared by dissolving 100 mg ninhydrin in 5 mL acetone (2% w/v). Polymer samples (5-10 mg) suspended in 0.5 mL of acetone was mixed with 0.5 mL ninhydrin solution in 1 mL clear high-performance liquid chromatography (HPLC) vials. The samples were heated to 90° C. for five minutes before the samples were assessed for colorimetric changes indicative of the presence of amines in the polymer. In addition, seawater from "day 30" from the polymer stability study (Example 4) was also analyzed for the presence of released I via the potential detection of amines in the seawater.

Some of the polymer samples generated a weak positive response in comparison with the positive controls I and M4 implying the presence of amines inside the polymer matrix. None of the water samples from the polymer release studies investigated suggested the presence of I in the water.

Gel Permeation Chromatography (GPC)

To investigate the ability of the monomers (M1 and M4) to generate linear homopolymers gel permeation chromatography (refractive index detection) was performed on polymer samples dissolved in tetrahydrofuran (THF) employing a Styragel HR (Waters) column and isocratic elution with THF at 1 mL/min. Polystyrene standards ($M_w$: 480, 1050 and 2200 g/mol) were employed to establish the approximate molecular weight of the prepared polymers.

The results showed that the prepared material eluted with retention times near that of the 500 g/mol standard indicating that polymerization conditions could be further optimized to enhance the yield of polymers.

Co-Polymerization of M5 or M6 Together with MMA

CP6R1 Co-Polymer Synthesis (M6 and MMA)

CP6R1 was synthesized from M6R5 without any purification of the M6R5 monomer. Azobisisobutyronitrile (AIBN) (0.82118 g) dissolved in 5 mL dimethylformamide (DMF), methyl methacrylate (MMA) (26.6 mL), and an additional 35 mL DMF were added to the M6R5 reaction product. This mixture was purged with argon gas before being sealed. The reaction was run for 5 hours.

The crude mixture was precipitated in 400 mL Tris buffer solution, then washed with pure water, before being washed with acetonitrile. This acetonitrile/polymer slurry was left to dry and a hard white polymer was obtained as the final product.

CP6R2 Co-Polymer Synthesis (M6 and MMA)

CP6R2 was synthesized from M6R6 without any purification of the M6R6 monomer. AIBN (1.65376 g) dissolved in 5 mL DMF, MMA (8.54 mL), and an additional 78 mL DMF were added to the M6R6 reaction product. This mixture was purged with argon gas before being sealed. The reaction was run for 4 hours.

CP6R1 had an AIBN:MMA:M6 ratio of 0.5:10:1, whereas CP6R2 had an AIBN:MMA:M6 ratio of 1:8:2. The resulting co-polymer CP6R2 was soluble in acetone and could be precipitated in water.

CP5R1 co-polymer synthesis (M5 and MMA)

CP5R1 was synthesized from M5R1 following a purification of the M5R1 monomer. The sticky M5R1 (4.0090 g) was dissolved in 45 mL DMF. AIBN (0.96481 g) and MMA (5.010 mL) were then added and this mixture was purged with argon gas. The reaction was run for 4.5 hours.

Co-polymerization of M5 or M6 together with more than one other monomer

It turned out that co-polymerizing of M5 and M6 together with other monomers was best performed using freshly prepared monomer and continue the polymerization in the same pot. Therefore both the monomer synthesis and polymer synthesis are described in the examples below Table 4 show all the synthesized polymers divided into groups (PoC, CP5, CP6 and MS) where the same method was used within each group. The only difference between syntheses within the group was the ratios used of the reagents and monomers. Therefore only one detailed example from each group is given below. The reaction temperature was 65° C. for all polymers except PoC_R2 and PoC_R3, which had a reaction temperature of 70° C.

The PoC-group contained M5 or M6, tri-isopropyl silyl acrylate (TIPSA), and MMA.

The CP5—and CP6-groups have M5 or M6, TIPSA and MMA and may contain either 2-methoxyethyl acrylate (MEA) or butyl methacrylate (BMA) to give it increased hydrophilicity or hydrophobicity.

The MS-group is the non-RAFT synthesis based on the corresponding polymers made with similar CP6 monomer ratios. The exception to this is MS_R13a, MS_R13b, and MS_R13_c. MS-synthesis was made in smaller scale in scintillation vials. Four monomers were used, M6, TIPSA, MMA and MEA or BMA mL) were added and the mixture was homogenized and sealed with rubber stoppers and parafilm under argon atmosphere. The reaction was left with stirring at 70° C. for 5.5 h. The reaction was terminated by removing the flask from the oil bath and opening it and letting oxygen terminate the radicals.

CP6_R4 (M6 6 mol %, TIPSA 21.15 mol %, MMA 63.45 mol % and 9.4 mol % MEA)

In a 3-neck round bottom flask, medetomidine 1 (0.6808 g) was dissolved with 10 ml DCM by stirring with a magnet. IEM (480 μl) was then added dropwise with the flask left unsealed to eventually let the DCM evaporate overnight. MMA (2.81 mL), TIPSA (6.11 mL), and MEA (0.68 mL). Xylene (20 mL) were added to the flask and mixed to homogenize.

AIBN (0.15206 g) and DSDA (0.19585 g) were added to individual scintillation vials. In the scintillation vial containing AIBN, butanone (1 ml) was added to dissolve the

TABLE 4

Summary of polymer synthesis amounts (mass or volume)

| Polymer name | AIBN [g] | DSDA [g] | I [g] | IEA [μl] | IEM [μl] | MMA [ml] | BMA [ml] | TIPSA [ml] | 2-MEA [ml] | Solvent | V [ml] | t [h] |
|---|---|---|---|---|---|---|---|---|---|---|---|---|
| PoC_R1 | 0.058 | 0 | 0.359 | 228 | 0 | 1.85 | 0 | 2.97 | 0 | Butanone | 45 | 5 |
| PoC_R2 | 0.145 | 0 | 1.071 | 0 | 750 | 2.81 | 0 | 6.08 | 0 | Butanone | 45 | 5.5 |
| PoC_R3 | 0.162 | 0 | 1.244 | 0 | 880 | 4.91 | 0 | 3.54 | 0 | Butanone | 45 | 5.5 |
| PoC_R4 | 0.163 | 0 | 1.245 | 0 | 880 | 4.91 | 0 | 3.54 | 0 | Butanone | 40 | 6 |
| CP5_R2 | 0.152 | 0.196 | 0.685 | 440 | 0 | 2.82 | 0 | 6.14 | 0.69 | Xylene | 40 | 6 |
| CP6_R3 | 0.151 | 0.195 | 0.691 | 0 | 490 | 2.81 | 0 | 6.11 | 0.68 | Butanone | 40 | 6 |
| CP6_R4 | 0.152 | 0.196 | 0.681 | 0 | 480 | 2.81 | 0 | 6.11 | 0.68 | Xylene | 40 | 6.5 |
| CP6_R5 | 0.170 | 0.219 | 0.794 | 0 | 560 | 4.9 | 0 | 3.56 | 0.8 | Xylene | 40 | 6 |
| CP6_R6 | 0.138 | 0.177 | 0.597 | 0 | 420 | 1.23 | 0 | 8.03 | 0.6 | Xylene | 40 | 6 |
| CP6_R7 | 0.153 | 0.197 | 0.689 | 0 | 490 | 2.68 | 0 | 5.83 | 1.04 | Xylene | 40 | 6 |
| CP6_R8 | 0.151 | 0.194 | 0.675 | 0 | 480 | 2.93 | 0 | 6.38 | 0.34 | Xylene | 40 | 6 |
| CP6_R9 | 0.151 | 0.194 | 0.676 | 0 | 480 | 2.79 | 0.84 | 6.07 | 0 | Xylene | 40 | 6 |
| CP6_R10 | 0.152 | 0.195 | 0.682 | 0 | 480 | 2.81 | 0 | 6.11 | 0.68 | Xylene | 40 | 6 |
| CP6_R11 | 0.153 | 0.198 | 0.689 | 0 | 490 | 2.68 | 0 | 5.83 | 1.04 | Xylene | 40 | 6 |
| CP6_R12 | 0.488 | 0.635 | 0.682 | 0 | 480 | 2.81 | 0 | 6.11 | 0.68 | Butanone | 40 | 6 |
| MS_R1 | 0.062 | 0 | 0.275 | 0 | 192 | 1.12 | 0 | 2.44 | 0.27 | Butanone | 6 | 5 |
| MS_R2 | 0.068 | 0 | 0.316 | 0 | 220 | 2.07 | 0.17 | 1.5 | 0 | Butanone | 6 | 5 |
| MS_R3 | 0.068 | 0 | 0.317 | 0 | 220 | 2.08 | 0 | 1.51 | 0.14 | Butanone | 6 | 5 |
| MS_R4 | 0.068 | 0 | 0.318 | 0 | 220 | 1.96 | 0 | 1.42 | 0.32 | Butanone | 6 | 5 |
| MS_R5 | 0.068 | 0 | 0.318 | 0 | 220 | 1.86 | 0 | 1.35 | 0.48 | Butanone | 6 | 5 |
| MS_R6 | 0.068 | 0 | 0.314 | 0 | 220 | 1.95 | 0.39 | 1.41 | 0 | Butanone | 6 | 5 |
| MS_R7 | 0.068 | 0 | 0.318 | 0 | 220 | 1.96 | 0 | 1.42 | 0.32 | Butanone | 6 | 5 |
| MS_R8 | 0.068 | 0 | 0.318 | 0 | 220 | 1.86 | 0 | 1.35 | 0.48 | Butanone | 6 | 5 |
| MS_R9 | 0.068 | 0 | 0.315 | 0 | 220 | 1.95 | 0.39 | 1.41 | 0 | Butanone | 6 | 5 |
| MS_R10 | 0.062 | 0 | 0.272 | 0 | 192 | 1.95 | 0 | 2.44 | 0.27 | Butanone | 6 | 5 |
| MS_R11 | 0.058 | 0 | 0.258 | 0 | 181 | 0.85 | 0 | 2.78 | 0.26 | Butanone | 6 | 5 |
| MS_R12 | 0.069 | 0 | 0.317 | 0 | 220 | 1.96 | 0 | 1.42 | 0.32 | Butanone | 6 | 5 |
| MS_R13a | 0.061 | 0.013 | 0.273 | 0 | 192 | 1.12 | 0 | 2.48 | 0.24 | Butanone | 6 | 5 |
| MS_R13b | 0.062 | 0.012 | 0.273 | 0 | 192 | 1.12 | 0 | 2.40 | 0.24 | Butanone | 6 | 5 |
| MS_R13c | 0.061 | 0 | 0.273 | 0 | 192 | 1.12 | 0 | 2.42 | 0.24 | Butanone | 6 | 5 |
| MS_R13d | 0.061 | 0.012 | 0.272 | 0 | 192 | 1.12 | 0 | 2.42 | 0.24 | Butanone | 6 | 5 |

AIBIN: azobis isobutyronitrile;
DSDA: tetraethyl thiuram disulfide;
I: medetomidine
IEA: isocyanatoethyl acrylate;
IEM: isocyanatoethyl methacrylate;
MMA: methyl methacrylate;
BMA: butyl methacrylate;
TIPSA: tri-isopropyl silyl acrylate;
2-MEA: 2-methoxyethyl acrylate;
V: solvent volume;
t: reaction time PoC_R2 (M6 10 mol %, TIPSA 45 mol % and MMA 45 mol %)

In a 100 mL 3-neck round bottom flask, medetomidine 1(1.07068 g) was dissolved in 10 ml DCM with a magnetic stirring, set in room temperature. IEM (750 μl) was added dropwise. After three hours, MMA (2.81 mL) and TIPSA (6.08 mL) were added. AIBN (0.14472 g) and butanone (40

AIBN. Once it had dissolved, xylene (9 ml) was added. This AIBN solution was then added to the reaction flask. In the scintillation vial containing DSDA, xylene (10 mL) was added to dissolve it. This DSDA solution was then added to the reaction flask. The reaction flask was purged with argon and sealed with rubber stopper and parafilm. The reaction was started by lowering the reaction flask down into a 65°

C. oil bath. The reaction was left in the bath for 6.5 hours and was then terminated by taking it out of the bath, opening the flask and letting oxygen terminate the radicals.

MS_R12 (M6 6 mol %, TIPSA 21.15 mol %, MMA 63.45 mol % and 9.4 mol % MEA)

In a scintillation vial, medetomidine I (0.31741 g) was dissolved with 4 ml DCM by stirring with a magnet. IEM (220 μL) was then added dropwise with the vial left unsealed to eventually evaporate the DCM overnight.

AIBN (0.06865 g), MMA (1.96 mL), TIPSA (1.42 mL), and MEA (0.32 mL) were added to the vial. The vial was sealed with a rubber stopper and wrapped with parafilm. Using a glass syringe, 6 mL of butanone was introduced. The content of the vial was mixed at room temperature. The vial was purged with argon for 20 minutes and was then lowered into the oil bath to start the polymerization reaction and was left at 65° C. for 5 hours. The reaction was terminated by bringing the vial out of the bath, opening the vessel and letting oxygen terminate the radicals.

Example 4

Release of Medetomidine from M4 Co-Polymers in Artificial Sea Water

Release of I from selected polymers was also established in artificial seawater in accordance with the monomer release studies. For the studies, 0.5 g polymer (the three polymer systems from Table 3 incorporating M4 as medetomidine monomer) was added to 20 mL artificial seawater, which was stirred (300 rpm) at ambient temperature. 1 mL samples were collected after 2, 10, and 15 days. These samples were filtered through a 0.22 μm syringe-driven filter to remove any solid residue before being analyzed using LC-MS. The samples were stored in freezer prior (~2 months) to analysis.

The polymeric PSB displayed a time dependent low linear release of 1 as graphically illustrated in FIG. 5.

A selection of prepared polymers (Table 3) was also incubated in seawater and the release of I from the material was analyzed. No release of I was detected from any of the polymer samples in the LC-MS analysis. No release would indicate either a low or no incorporation of the monomers into the polymers or no hydrolysis of the incorporated monomers under the experimental conditions employed. Previous results (monomer release and FT-IR studies) suggest that both events are likely and it is impossible to distinguish between their potential individual contributions to the results here. Potential residual free I from the polymer synthesis would have been washed away during the work-up and would not produce a "constant" release as that observed for the monomer release studies.

Example 5

Medetomidine was also linked to isocyanate functionalized polystyrene beads (from Biotage) to function as a model polymer system (shown in FIG. 3) to study the release of medetomidine from a polymer.

Preparation of Medetomidine Loaded Polystyrene Beads (PSB)

Figure 3:
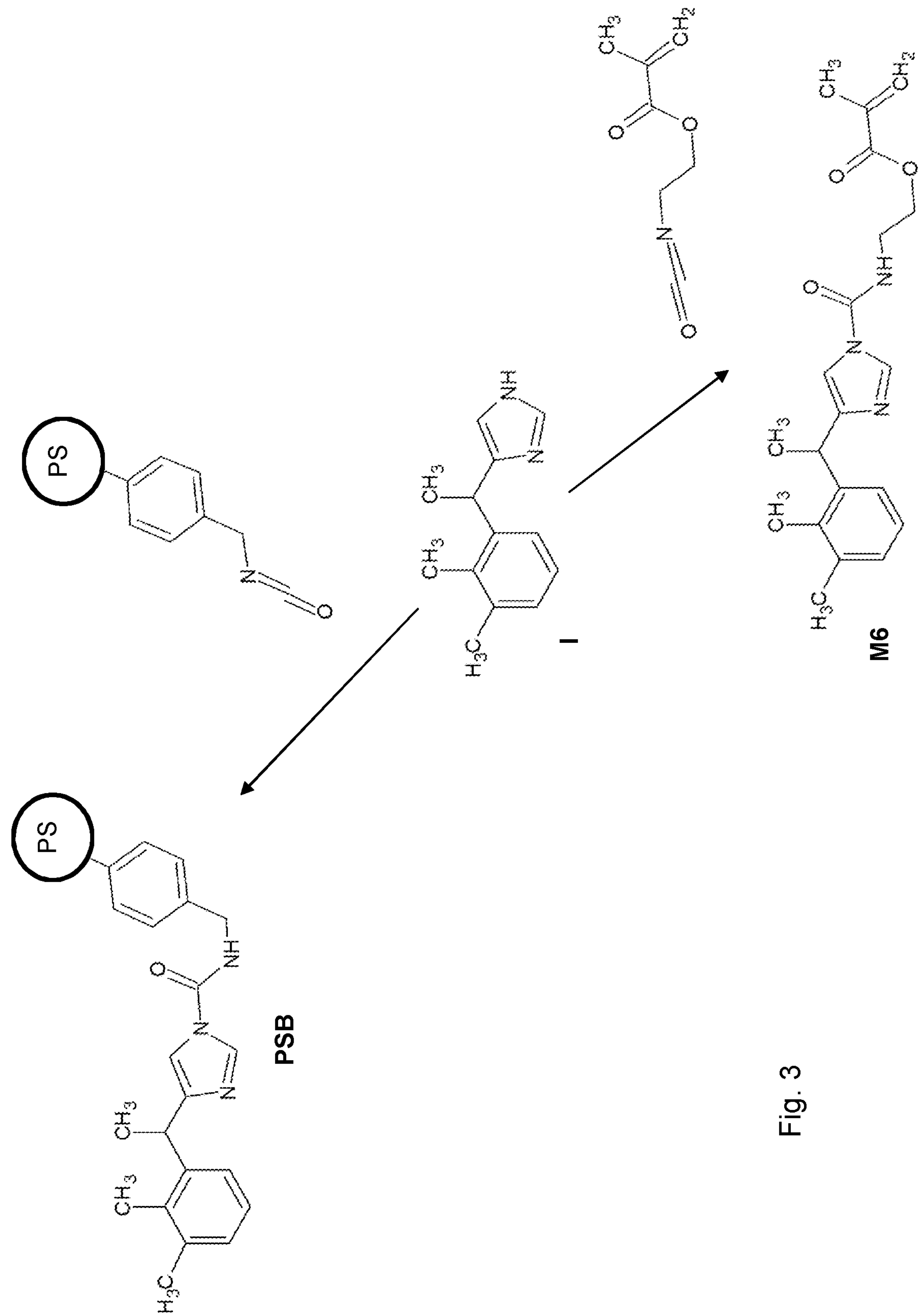
FIG. 3 illustrates a reaction scheme for the production of 2-({4-[1-(2,3-dimethylphenyl)ethyl]-1H-imidazole-1-carbonyl}amino)ethyl 2-methylprop-2-enoate (M6) and polystyrene medetomidine (PSB) according to an embodiment.

The polystyrene immobilized medetomidine (PSB) was generated by reacting I with polystyrene methylisocyanate employing the same coupling conditions used to produce M4, see FIG. 3.

The synthesis of PSB was performed in syringes (20 mL) fitted with filters to retain the polystyrene beads. 1 g of polystyrene methylisocyanate beads (Biotage 800261 batch 04446, capacity 1.48 mmol/g) was added to the syringe followed by the addition of I (446 mg, 2.23 mmol, 1.5 equiv.) and pyridine (0.36 mL, 4.46 mmol, 3 equiv.) dissolved in anhydrous dichloromethane (10 mL). The syringe was agitated overnight at room temperature. After 24 h the syringe was drained and the beads were three times washed with dichloromethane before the material was freeze dried. 5 mg of PSB was removed and exposed to 1 mL of TFA/dichloromethane (1:1) under sonication. Liquid chromatography— mass spectrometry (LC-MS) analysis revealed a release of I indicating cleavage of the urea bond to the polystyrene bead. In total 2 g of PSB was prepared in two batches.

The washed and dried beads were studied using Fourier-transform infrared spectroscopy (FTIR) and comparison of PSB with the unreacted polystyrene methylisocyanate revealed a complete loss of the isocyanate peak at 2259 $cm^{-1}$ and an appearance of a weak carbonyl signal at 1720 $cm^{-1}$, which could be linked to the urea bond carbonyl in PSB

Example 6

Incubation of Medetomidine-Loaded Polymer in Sea Water Mimic Buffer

Three weightings of 5 mg each of the medetomidine loaded polystyrene beads (PSB) from Example 5 was added to three 50 mL glass bottles with screw caps. 20 mL of sea water mimic buffer, 0.05 M phosphate buffer at pH 8 with 3% NaCl, was added, with the polymer lying on the surface of the solutions. The three bottles were incubated in the dark at +5° C. (cold room), room temperature (RT) and at +50° C. (water bath) with gentle stirring, keeping the polymer still lying on the surface. The solutions at +5° C. and RT were gently stirred by magnetic stirrer and the bottle in the +50° C. water bath was gently shaken.

Aliquots were removed from the incubations after 1 and 4 hours and after 1, 4, 7, 11, 14, 18 and 21 days. The concentration of medetomidine in the samples was quantified using a calibration curve. In more detail, a sampling volume (100 μL) was added directly into LC vials of glass with inserts and the solutions were injected as such. At later time points the samples from the incubation at +50° C. was diluted 1:10 (10 μL+90 μL buffer) respectively 1:20 (10 μL+190 μL buffer) before injection.

A series of six working standard solutions of medetomidine was prepared in water/ethanol (75/25, v/v), with hundred times the final concentrations in sea water mimic buffer (see Table 5). Initially a 10 mM stock solution of medetomidine in EtOH was diluted 1:100 by adding 5 μL to 495 μL water/ethanol (75/25, v/v) giving a concentration of 100 μM:

S1 60 μL of 100 μM was added to 540 μL water/ethanol (75/25, v/v)

S2 300 μL of S1 was added to 700 μL water/ethanol (75/25, v/v)

S3 300 μL of S2 was added to 600 μL water/ethanol (75/25, v/v)

S4 300 μL of S3 was added to 700 μL water/ethanol (75/25, v/v)

S5 300 μL of S4 was added to 600 μL water/ethanol (75/25, v/v)

S6 300 μL of S5 was added to 700 μL water/ethanol (75/25, v/v)

A volume of 10 μL of the working standard solutions was spiked individually into 990 μL of sea water mimic buffer pH 8 with 3% NaCl. The dilutions were made directly into LC vials of glass. A blank sample was prepared by adding 10 μL water/ethanol (75/25, v/v) into 990 μL sea water mimic buffer.

TABLE 5

Concentrations (nM) in the working standard solutions and the final concentrations in the calibration samples in sea water mimic buffer

| Calibration samples | Concentration (nM) Working std solutions in water/ethanol | Sea water mimic buffer |
|---|---|---|
| S1 | 10000 | 100 |
| S2 | 3000 | 30 |
| S3 | 1000 | 10 |
| S4 | 300 | 3 |
| S5 | 100 | 1 |
| S6 | 30 | 0.3 |
| Blank | 0 | 0 |

A few injections were made up front to assure that the instrumentation was equilibrated. A calibration curve was injected in the beginning and in the end of the analytical sequence, bracketing the unknown samples.

All samples were analyzed within 24 h after sampling, together with a three-point calibration curve, to be able to follow the changes in concentrations. The samples were then stored dark at RT in the LC vials until the last sampling occasion, when all samples were analyzed/reanalyzed and quantified vs a freshly prepared calibration curve. The reanalyzed samples showed good agreement with the initial analysis, with a difference of less than 10% for most samples and with >20% for two samples out of the twenty-seven samples. All calculations are based on data from the final analysis occasion.

The order of the injected samples in the final analytical sequence was as follows; Blank, Calibration samples S1 to S6, Blank, 1 h (+5° C., RT, +50° C.), 4 h (+5° C., RT, +50° C.), 24 h (+5° C., RT, +50° C.), 96 h (+5° C., RT, +50° C. 1:10), 168 h (+5° C., RT, +50° C. 1:10), 264 h (+5° C., RT, +50° C. 1:20), 336 h (+5° C., RT, +50° C. 1:20), 432 h (+5° C., RT, +50° C. 1:20), 504 h (+5° C., RT, +50° C. 1:20), Blank, Calibration samples S1 to S6, Blank.

Figure 6A:
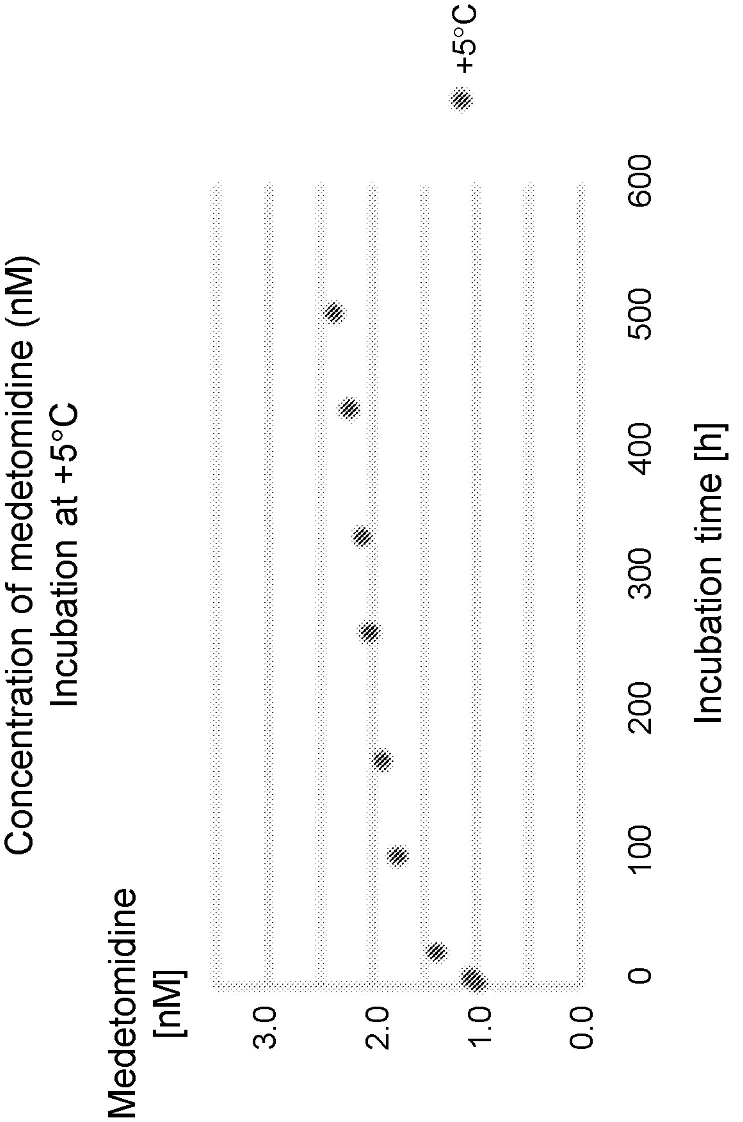
FIG. 6 illustrates the concentration of medetomidine (nM) in the incubation medium (0.05 M phosphate buffer pH 8.0 with 3% NaCl) plotted against incubation time for the three evaluated incubation temperatures: (A): +5° C., (B): room temperature (RT) and (C): +50° C.
Figure 6B:
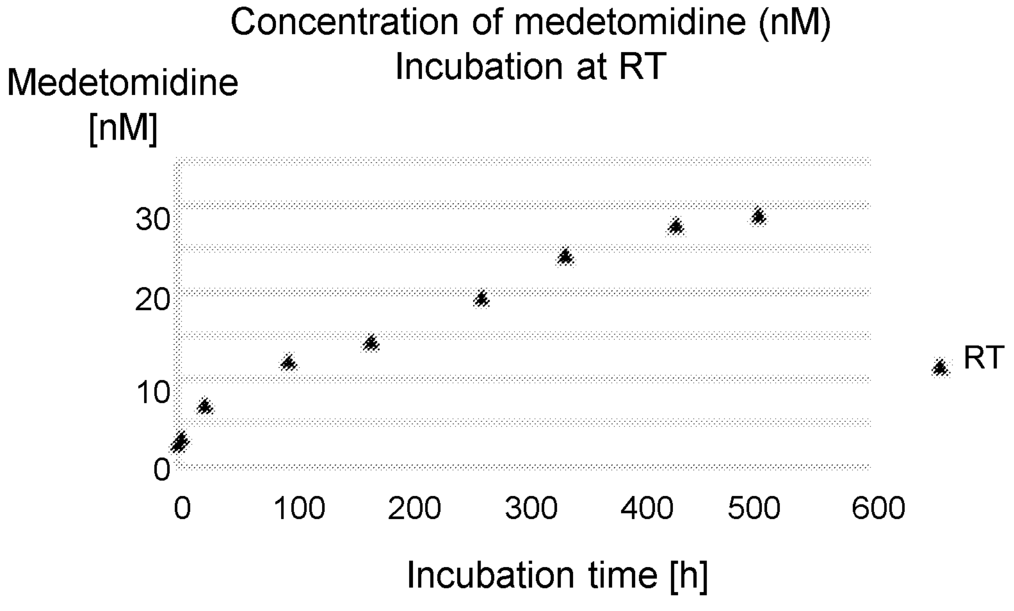
Figure 6C:
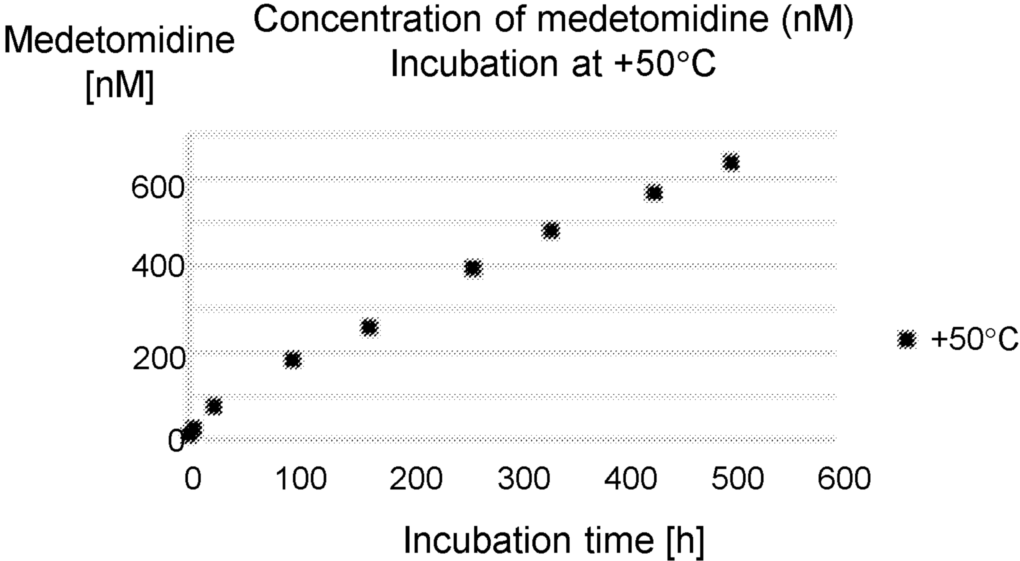
Figure 7A:
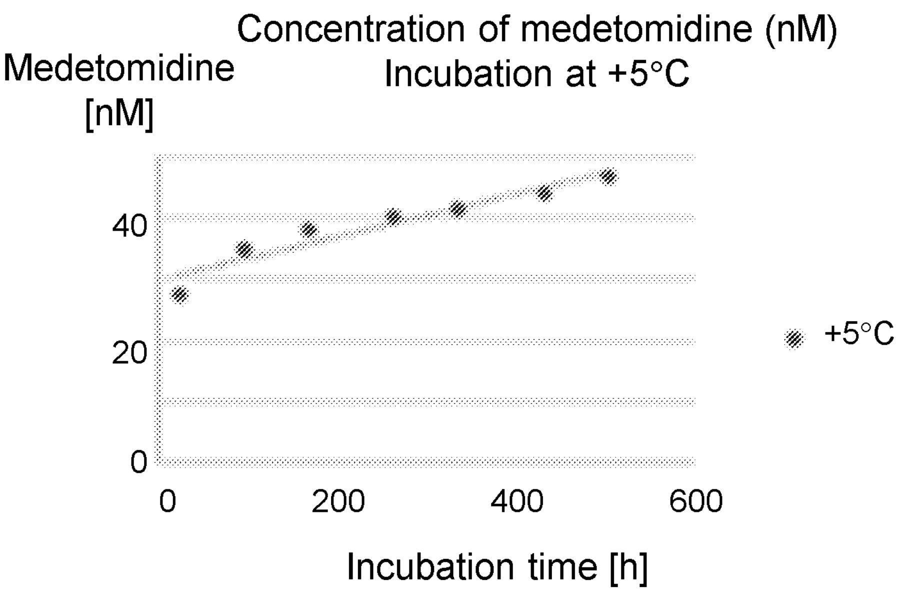
FIG. 7 illustrates the amount of released medetomidine (pmol) plotted vs the incubation period from day 1 (24 h) until day 21 (504 h), considered as the constant period of compound release. The slopes were calculated and represent pmol released medetomidine per hour. (A): +5° C., (B): room temperature (RT) and (C): +50° C.
Figure 7B:
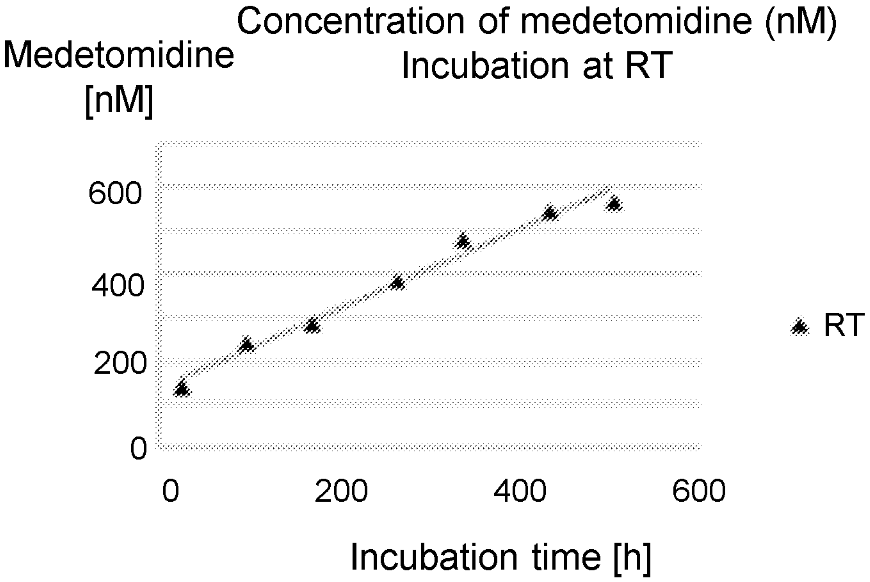
Figure 7C:
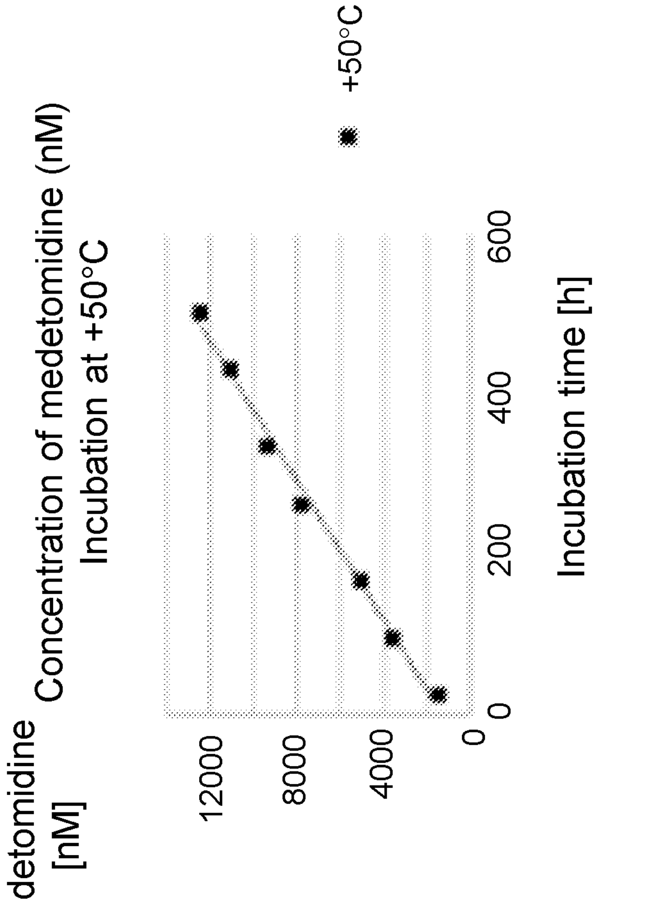

The data indicates a faster release of medetomidine during the initial phase, up to approximately 24 hours, potentially corresponding to a wash-out phase of unbound medetomidine from the polymer. Subsequently, another release phase follows characterized by a slower constant rate during the last twenty days of the three weeks of incubation. This was experienced for all three evaluated temperatures (+5° C., RT and +50° C.), see FIGS. 6A to 6C. However, the rate of release of medetomidine was different between the three evaluated temperatures. The total amount of released medetomidine was calculated in picomol (pmol) and was plotted against time during the period of constant compound release (day 1 to day 21), see FIGS. 7A to 7C, and the rate of release was calculated as pmol/h/mg polymer. Assuming a linear relationship, the release rate of medetomidine at +5° C. was about 0.007 pmol/h/mg polymer, at RT about 0.18 pmol/h/mg polymer and about 4.6 pmol/h/mg polymer for the incubation at +50° C.

Table 6 summaries the results plotted in FIGS. 6 and 7.

TABLE 6

Measured concentrations of medetomidine (nM) and the calculated released amounts of medetomidine (pmol) over time

| | +5° C. | | RT | | +50° C. | |
|---|---|---|---|---|---|---|
| Time (h) | Concentration (nM) | Released amount (pmol) | Concentration (nM) | Released amount (pmol) | Concentration (nM) | Released amount (pmol) |
| 1 | 1.01 | 20.2 | 2.67 | 53.4 | 9.67 | 193 |
| 4 | 1.06 | 21.2 | 3.43 | 68.5 | 25.5 | 508 |
| 24 | 1.39 | 27.6 | 7.04 | 139 | 75.3 | 1487 |
| 96 | 1.76 | 35.0 | 12.2 | 242 | 183 | 3616 |
| 168 | 1.92 | 38.2 | 14.4 | 285 | 257 | 5067 |
| 264 | 2.03 | 40.3 | 19.4 | 382 | 396 | 7777 |
| 336 | 2.10 | 41.7 | 24.3 | 477 | 480 | 9407 |
| 432 | 2.23 | 44.2 | 27.8 | 545 | 566 | 11067 |
| 504 | 2.37 | 46.9 | 28.9 | 566 | 638 | 12450 |

Example 7

Leaching Rate of Medetomidine (I) from Copolymers

The crude polymer product from MS_R7 and MS_R13a were precipitated in methanol and the methanol/monomer/reaction residues mixture was decanted off. The "wet polymer" contained some butanone and methanol. The wet polymer was immediately re-dissolved back into butanone before it was used for the leach rate study.

In a weighed scintillation vial, 200-500 μl of polymer solution was cast onto the base of the vial (inner diameter of this vial was 25 mm) and left to dry for two days. The vial was weighed again to determine the mass of the polymer.

Artificial seawater (1.5 ml) was added to the vial and closed off with a cap. After one month, all the seawater in the vial was removed, and fresh artificial seawater was introduced. This was repeated for three months. The concentration of medetomidine in the artificial seawater was determined with HPLC after each month

TABLE 7 release of medetomidine (I) over time and area from polymers in sea water

| | MS_R7 | | | MS_R13A | | |
|---|---|---|---|---|---|---|
| | Time [months] | | | | | |
| | 1 | 2 | 3 | 1 | 2 | 3 |
| I released [μg] | 495.8 | 178.2 | 66.5 | 1380 | 85.7 | 56.7 |
| I cumulative release [μg] | 495.8 | 674 | 740.5 | 1380 | 1465 | 1522 |
| I released per area [μg/mm$^2$] | 1.01 | 1.37 | 1.51 | 2.81 | 2.98 | 3.10 |

After an initial burst, there was a slow release of medetomidine over time. The results show that the polymers were hydrolyzing and medetomidine was released over time.

Example 8

Paint Formulation and Performance of Medetomidine Containing Copolymers in Marine Paint Formulations on Panels in the Sea Paint Formulations and Application to Test Panels In Table 8, the content of medetomidine, Cu—Pt and $Cu_2O$ of the formulation 1-6 are presented. A general description for preparation of control formulation is as follows. 8 g of hydrogenated Rosin ((2E)-3-Phenylprop-2-en-1-yl p-D-glucopyranoside) was dissolved in 28 ml xylene at 3000 rpm for 2 minutes using a speed mixer (Synergy Devices Ltd, UK). This was followed by addition of 0.5 g of soy lecithin, 9 g of acrylic resin at 5+4 g aliquots, 2 g of plasticizer, 8 g of iron oxide, 2 g of GARAMITE® clay, 0,5 g mica, 10 g of barium sulphate at 5+5 g aliquots, 9 g of talc in 5+4 g aliquots and 10 g $Cu_2O$. After each addition step, there was a mixing step at 3000 rpm for 2-5 minutes depending on dispersion of components (visual inspection). After these steps, viscosity was adjusted by addition of 3-16 ml of xylene and mixing continued until the temperature reached 40° C., indicating good dispersion of the paint components. During preparation of formulation #2 Cu—Pt (1 g) and medetomidine (0.1 g) were added before the talc addition step. In formulation #3-6, the polymer conjugated with medetomidine was added first before dissolving the rosin. Around 1.5 g of this polymer was added, either as crude (dissolved in butanone) or as precipitate (following a MeOH wash), resulting in a final concentration of bound medetomidine in the range of 0.10-0.18 weight % (Table 8). The acrylic resin was reduced to 8 g to compensate for the addition of medetomidine containing binder.

TABLE 8

| Paint formulations | | | | |
|---|---|---|---|---|
| Formulation # | Medetomidine [wt %] | Cu—Pt [wt %] | $Cu_2O$ [wt %] | Note |
| #1 | — | — | 11.6 | Control |
| #2 | 0.10 | 1.1 | 10.0 | Reference, Free medetomidine |
| #3 | 0.12 | 1.1 | 10.3 | Medetomidine polymer bound, MS_R12 |
| #4 | 0.18 | 1.1 | 10.6 | Medetomidine polymer bound, MS_R12 |
| #5 | 0.10 | 1.1 | 10.5 | Medetomidine polymer bound, MS_R13a |
| #6 | 0.10 | 1.0 | 9.7 | Medetomidine polymer bound, MS_R13b |

3 PMMA panels (25×15 cm) were first coated with an epoxy primer. Two layers of formulation #1-6 were then applied by the use of a roller resulting in dry weight of around 5 g of coating/panel. Drying or the paint was performed at ambient humidity and temperature.

Field Study

A field study was carried out at Kristineberg centre on the west coast of Sweden (58° 25'01.0"N 11° 44'45.3"E, Baltic Sea transition zone). Coated PMMA panels (25×15 cm) were deployed by hanging them with a tie strap on an aluminium frames (190×91 cm) using pre-drilled holes on the corners of the panels. The panels were randomly distributed on the frame both achieving a random vertical and lateral distribution. Uncoated panels (epoxy primer) as well as control coating without any medetomidine (formulation #1) were used as negative controls. A coating with free medetomidine (formulation #2) was used as positive control. Water depth ranged from 25 cm to 205 cm. The field study was initiated in June (Jun. 23, 2021) when the fouling pressure is known to be highest and inspected visually and photographed monthly during summer season with last inspection at 9 Sep. 2021. The degree of fouling and species was assessed based on visual inspection and photographs.

Results

Figure 9:
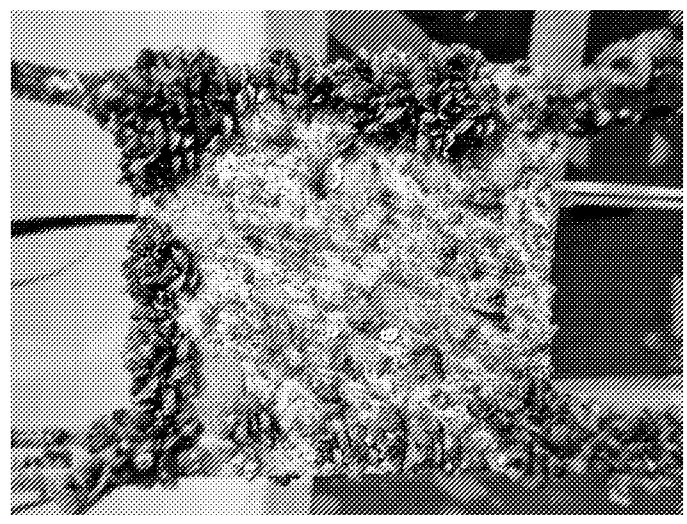
FIG. 9 shows epoxy control PMMA panels following 13 weeks of immersion.
Figure 9:
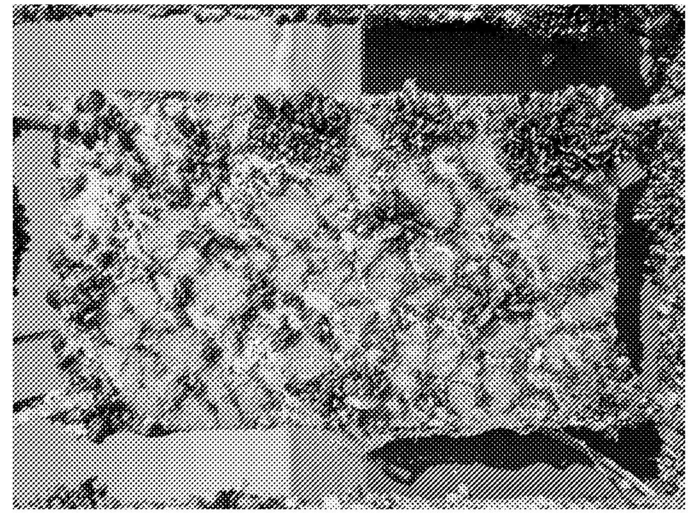
Figure 9:
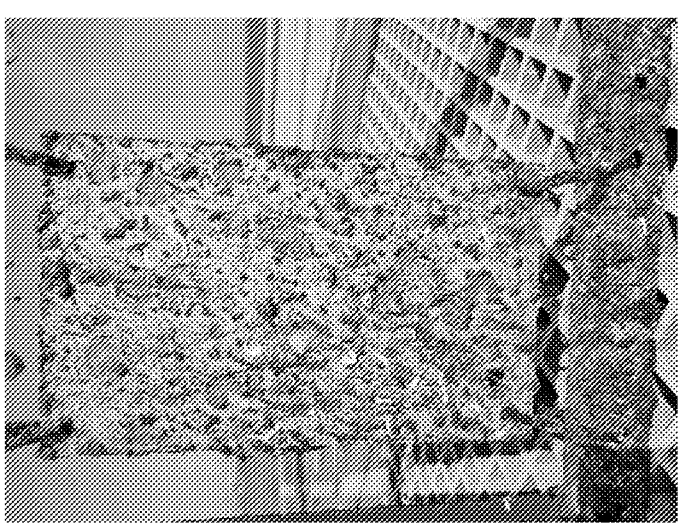
Figure 10:
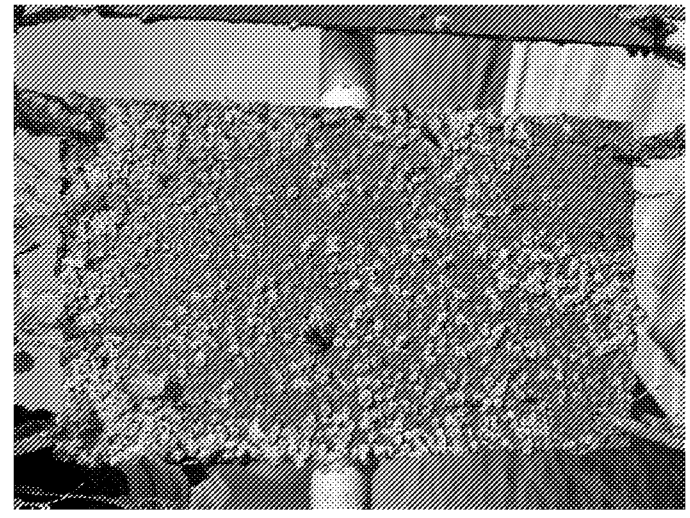
FIG. 10 shows free medetomidine formulation PMMA panels 13 weeks of immersion.
Figure 10:
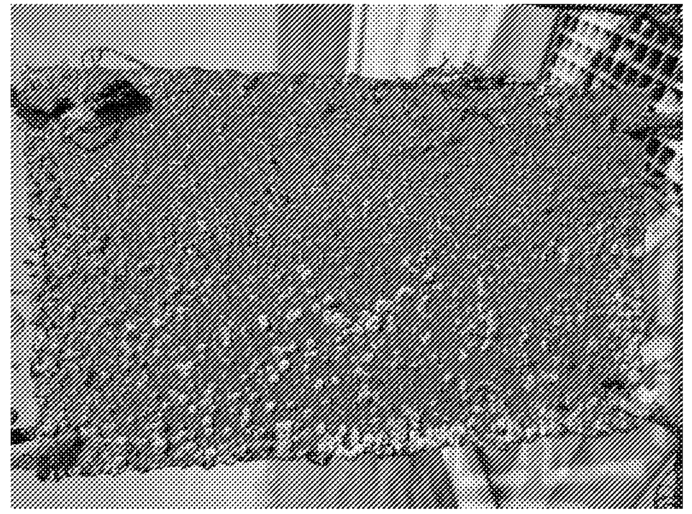
Figure 10:
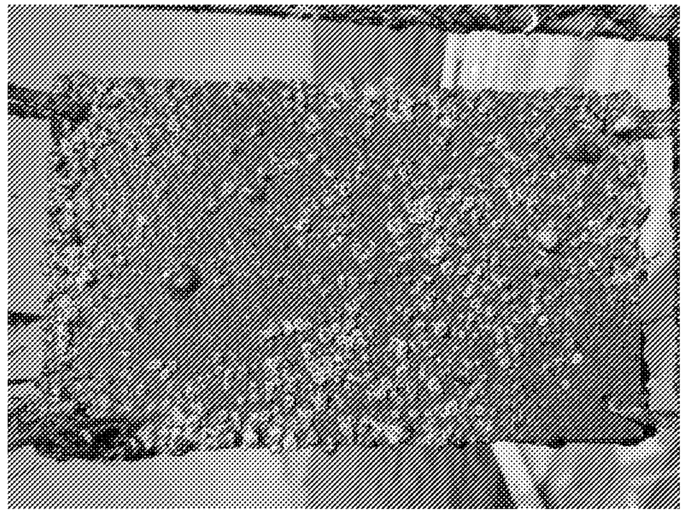
Figure 11:
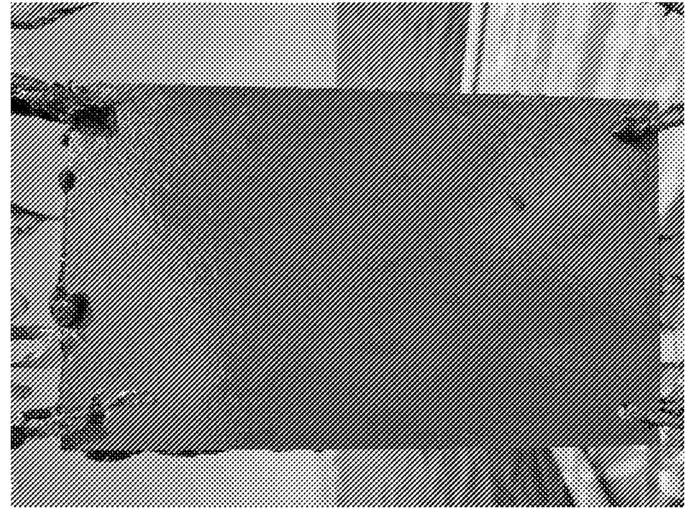
FIG. 11 shows formulation #2 PMMA panels 13 weeks of immersion.
Figure 11:
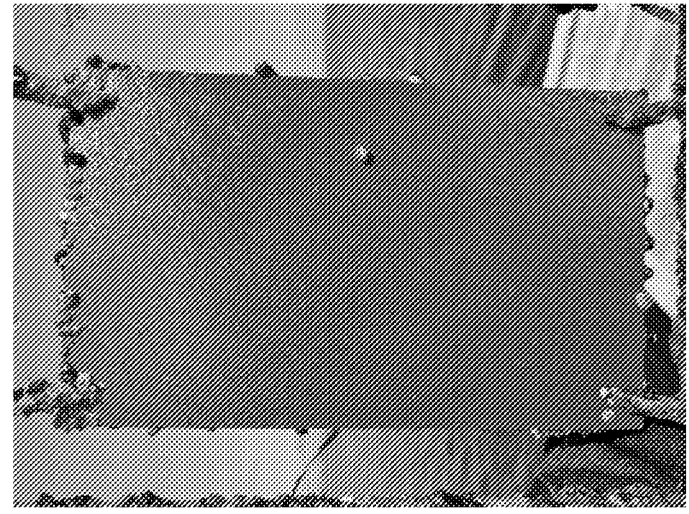
Figure 11:
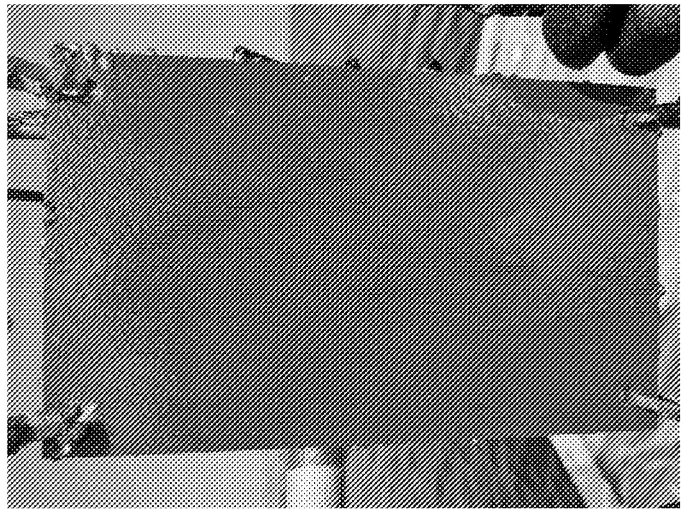
Figure 12:
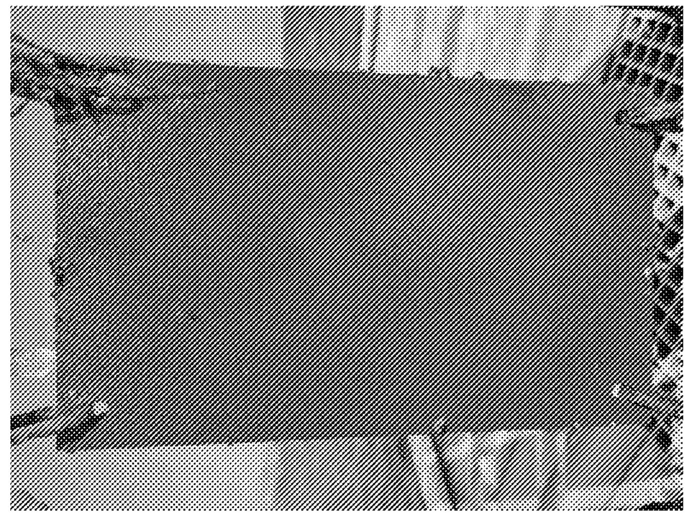
FIG. 12 shows formulation #3 PMMA panels 13 weeks of immersion.
Figure 12:
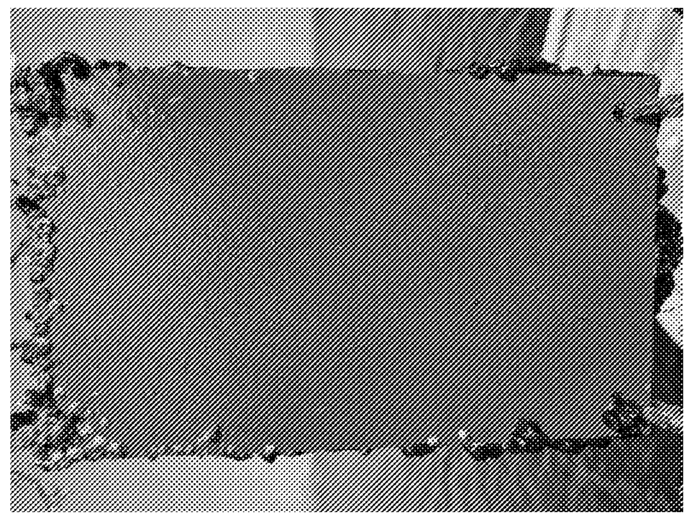
Figure 12:
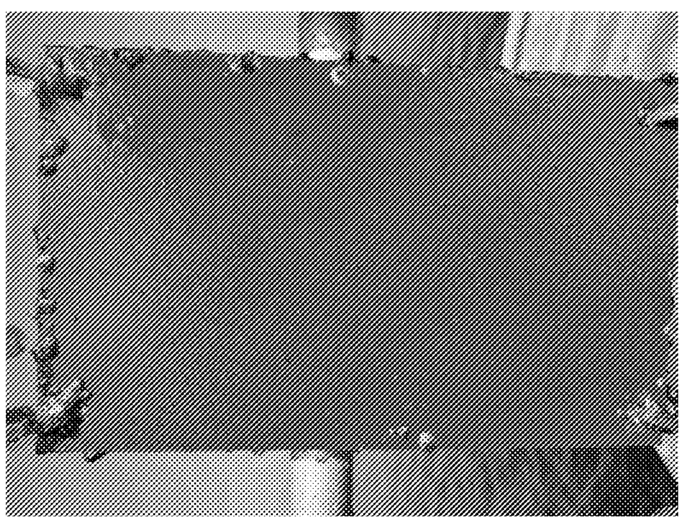
Figure 13:
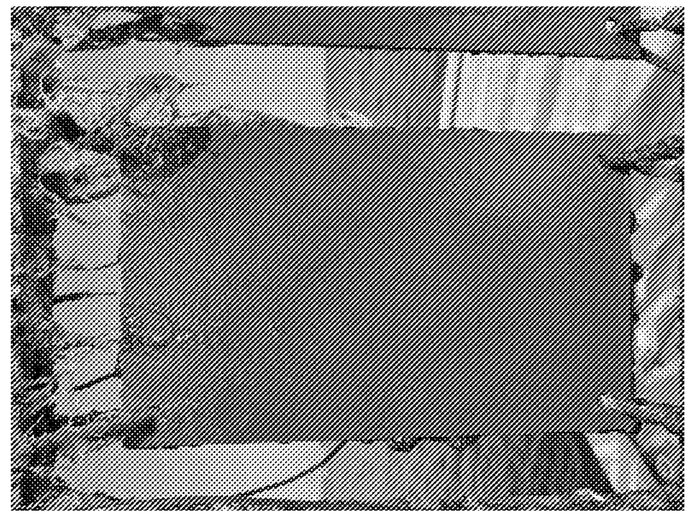
FIG. 13 shows formulation #4 PMMA panels 13 weeks of immersion.
Figure 13:
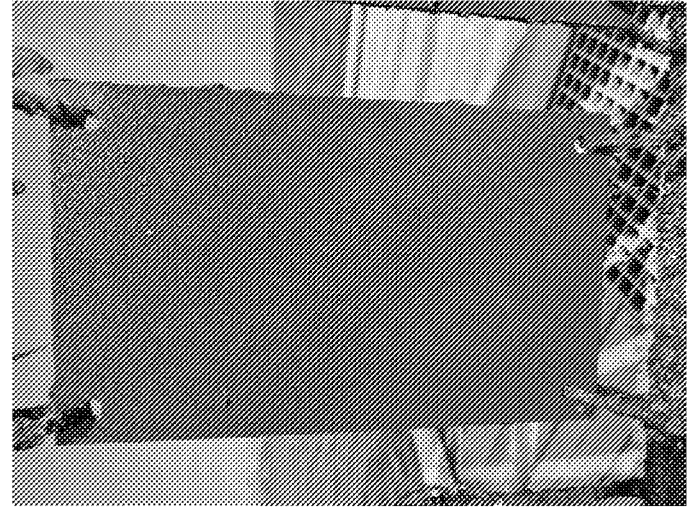
Figure 13:
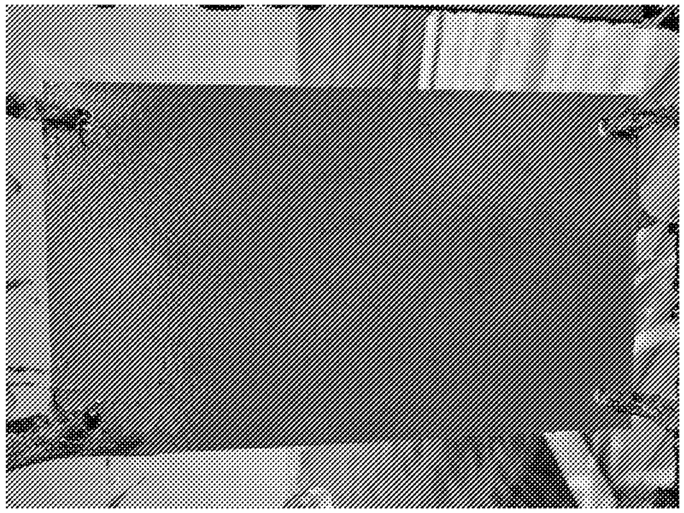
Figure 14:
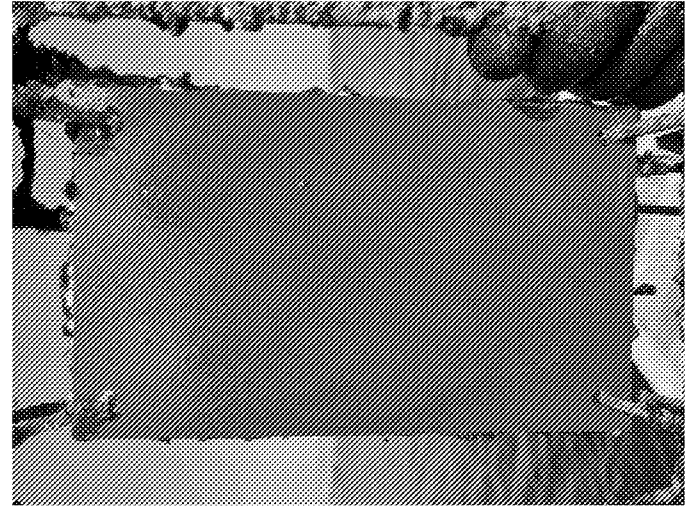
FIG. 14 shows formulation #5 PMMA panels 13 weeks of immersion.
Figure 14:
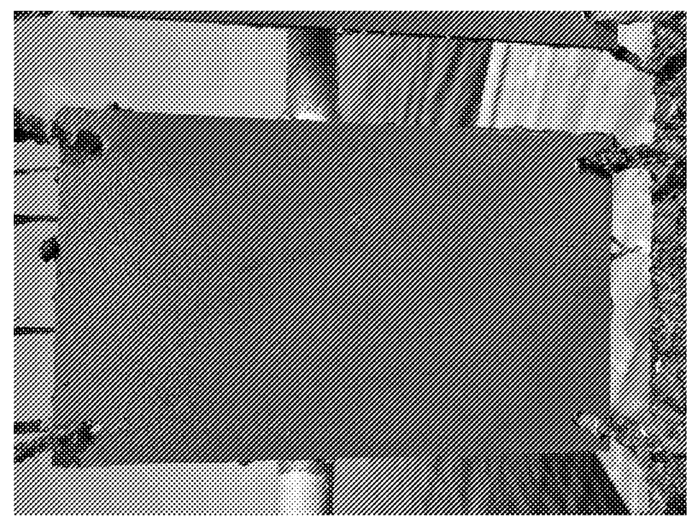
Figure 14:
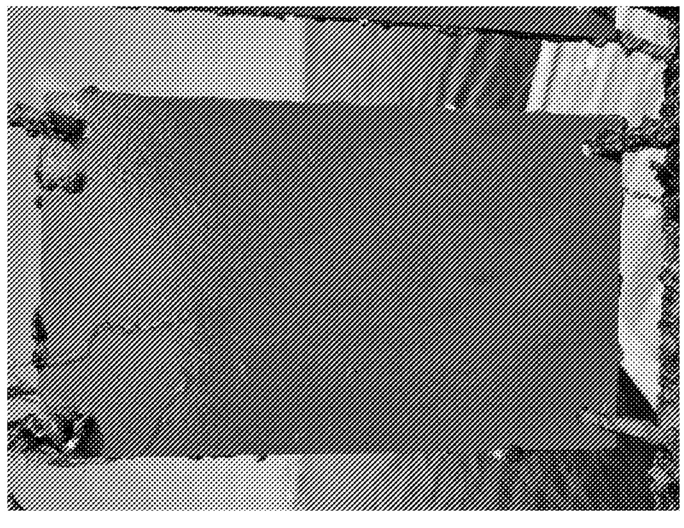
Figure 15:
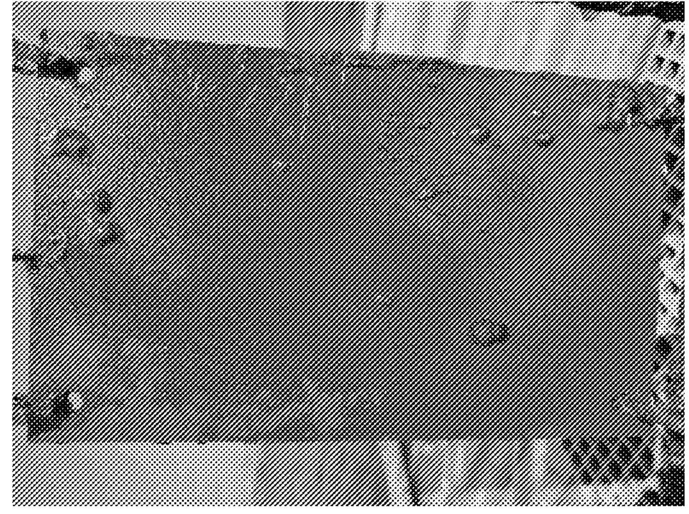
FIG. 15 shows formulation #6 PMMA panels 13 weeks of immersion.
Figure 15:
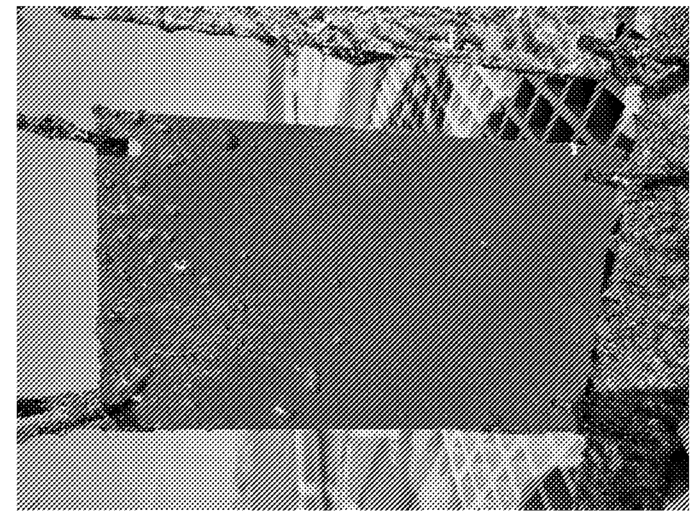
Figure 15:
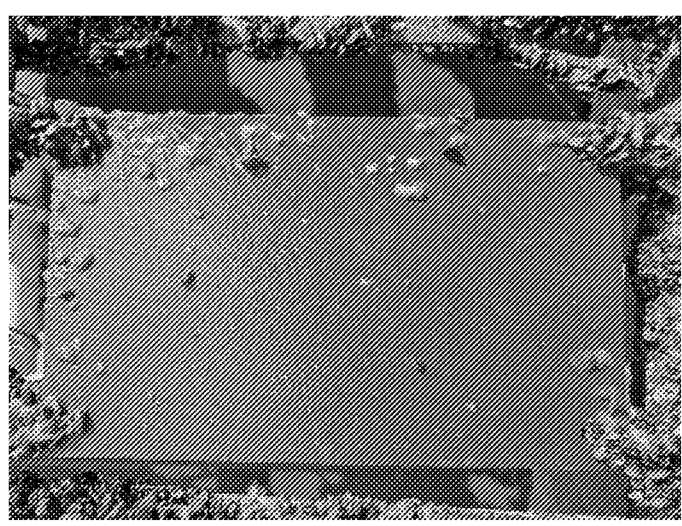

Both the epoxy control and control formulation (formulation #1) showed high degree of fouling accumulation after 13 weeks of immersion (FIGS. 9 and 10). Fouling species on expoxy control included, for example, barnacles, mussel, bryozoa, tunicate, green algae, filamentous algae and tubeworm (FIG. 9). On control formulation (formulation #1), the biofouling was mainly barnacles (FIG. 10. A few tunicates were visible, but in principle the control formulation was selective for barnacle accumulation and, thus, relevant to use for studying the effect upon addition of medetomidine, both free or as polymer bound. By adding medetomidine dispersed (free) at 0.1% in the coating (formulation #2) no accumulation of barnacles was observed showing the potential of medetomidine in preventing barnacle settling (FIG. 11). Comparable results were observed when investigating the settling of barnacles on formulations (formulation #3-6) containing medetomidine bound to an eroding polymer binder. Formulation #3 showed some barnacle settling along the periphery of the panels but in principle the formulation worked acceptable. Formulation #3 contained non-purified polymer (crude from synthesis was used directly in the formulation) at 0.1% (FIG. 12). Interestingly, adding this polymer at slightly higher concentration (0.18%) as in formulation #4 improved the performance (FIG. 13) and no barnacle settling was observed on this formulation. In formulation #5 (FIG. 14) and formulation #6 (FIG. 15), the molar composition in the polymer was changed by decreasing the MMA and increasing the TIPSA molar concentration in the feed during polymerization. In formulation #5, a polymer synthesized by radical polymerization was used and in formulation #6 a polymer synthesized by RAFT polymerization was used. As can be seen in FIGS. 14 and 15, both these formulations performed comparable with formulation #2 (free medetomidine) showing no barnacle settling. However, on formulation #6 some tunicates and filamentous algae were observed (FIG. 15). In conclusion, formulations containing polymer bound medetomidine, depending on hydrolysis for the release, can perform comparable with formulations having medetomidine dispersed (free).

TABLE 9

| Area covered by various fouling organism on each test panel | | | | | | | | |
|---|---|---|---|---|---|---|---|---|
| Formulation_panel replicate no. | Barnacles (%) | Bryozoa (%) | Sea anemones (%) | Blue mussel (%) | Tube worm (%) | Green algae and filamentous algae (%) | Tunicate (%) | Total biofouling coverage (%) |
| Epoxy rep 1 | 2 | 25 | 5 | 2 | 2 | 15 | 0 | 51 |
| Epoxy rep 2 | 8 | 50 | 0 | 25 | 1 | 10 | 0 | 94 |
| Epoxy rep 3 | 2 | 20 | 2 | 40 | 1 | 30 | 0 | 95 |
| #1_rep 1 | 30 | 0 | 1* | 0 | 0 | 0 | 1* | 32 |
| #1_rep 2 | 25 | 0 | 2 | 0 | 0 | 0 | 1* | 28 |
| #1_rep 3 | 25 | 0 | 0 | 1 | 0 | 3 | 0 | 29 |
| #2_rep 1 | 1** | 0 | 0 | 1* | 0 | 0 | 0 | 2 |
| #2_rep 2 | 1** | 0 | 0 | 1* | 0 | 0 | 0 | 2 |

TABLE 9-continued

| Area covered by various fouling organism on each test panel | | | | | | | | |
|---|---|---|---|---|---|---|---|---|
| Formulation_panel replicate no. | Barnacles (%) | Bryozoa (%) | Sea anemones (%) | Blue mussel (%) | Tube worm (%) | Green algae and filamentous algae (%) | Tunicate (%) | Total biofouling coverage (%) |
| #2_rep 3 | 0 | 0 | 0 | 0 | 0 | 0 | 0 | 0 |
| #3_rep 1 | 2 | 0 | 0 | 0 | 0 | 0 | 0 | 2 |
| #3_rep 2 | 4 | 0 | 0 | 0 | 0 | 1 | 0 | 5 |
| #3_rep 3 | 1 | 0 | 0 | 0 | 0 | 0 | 0 | 1 |
| #4_rep 1 | 0 | 0 | 0 | 0 | 0 | 0 | 0 | 0 |
| #4_rep 2 | 0 | 0 | 0 | 0 | 0 | 0 | 0 | 0 |
| #4_rep 3 | 0 | 0 | 0 | 0 | 0 | 0 | 0 | 0 |
| #5_rep 1 | 0 | 0 | 0 | 0 | 0 | 0 | 0 | 0 |
| #5_rep 2 | 0 | 0 | 0 | 0 | 0 | 0 | 0 | 0 |
| #5_rep 3 | 0 | 0 | 0 | 0 | 0 | 0 | 0 | 0 |
| #6_rep 1 | 0 | 0 | 4 | 2 | 0 | 0 | 0 | 6 |
| #6_rep 2 | 0 | 0 | 3 | 0 | 0 | 2 | 0 | 5 |
| #6_rep 3 | 0 | 0 | 3 | 0 | 0 | 2 | 0 | 5 |

*one individual

**a few individuals

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. An antifouling polymer comprising a plurality of repeating units, wherein at least a portion of the plurality of repeating units comprises medetomidine, or an enantiomer, base or salt thereof, covalently bound to the repeating unit through a hydrolysable bond.

2. The polymer according to claim 1, wherein the polymer is a co-polymer and the plurality of repeating units comprises (a) a first type of repeating unit comprising medetomidine, or the enantiomer, base or salt thereof, covalently bound to the first type of repeating unit through the hydrolysable bond; and (b) a second type of repeating unit lacking medetomidine, or an enantiomer, base or salt thereof.

3. The polymer according to claim 1, wherein the polymer is a homopolymer of repeating unit comprising medetomidine, or the enantiomer, base or salt thereof.

4. The polymer according to claim 3, wherein the homopolymer is selected from the group consisting of a poly(medetomidine methacrylate), a poly(allylsulfonyl medetomidone), a poly(allyl medetomidine), a poly(medetomidine acrylate) and a poly(silyl medetomidine).

5. The polymer according to claim 1, wherein medetomidine, or the enantiomer, base or salt thereof, is covalently bound to the repeating unit through the hydrolysable bond between an nitrogen on the imidazole ring of medetomidine, or the enantiomer, base or salt thereof, and the monomer.

6. The polymer according to claim 1, wherein the repeating unit comprising medetomidine, or the enantiomer, base or salt thereof, has a general formula II or III:

(II)

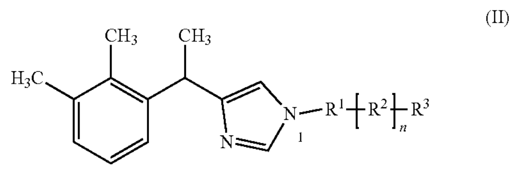

(III)

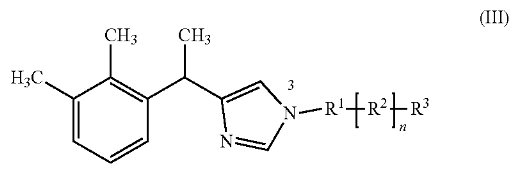

wherein $R^1$ is selected from the group consisting of formula IV to VI:

(IV)

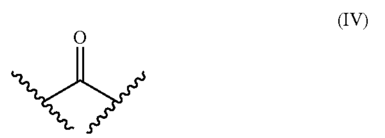

(V)

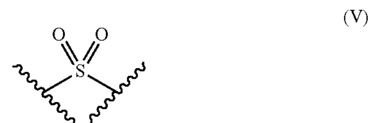

(VI)

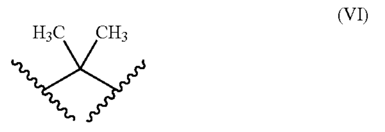

$R^2$ is selected from the group consisting of formula VII and VIII:

(VII)

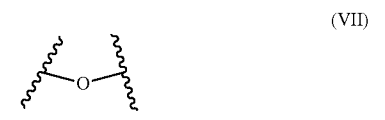

-continued (VIII)

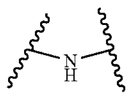

n is 0 or 1;

$R^3$ is selected from the group consisting of formula IX to XIV:

(IX)

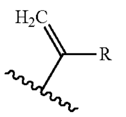

(X)

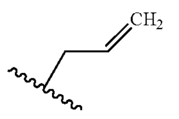

(XI)

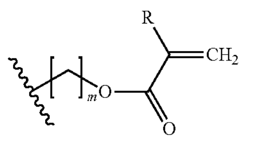

m is 0, 1, 2 or 3;

(XII)

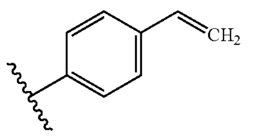

(XIII)

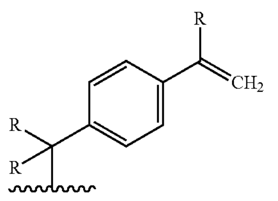

(XIV)

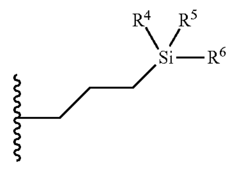

R is independently H or alkyl; and $R^4$, $R^5$ and $R^6$ is independently alkoxy.

7. The polymer according to claim 1, wherein the repeating unit comprising medetomidine, or the enantiomer, base or salt thereof, is selected from the group consisting of 1-{4-[1-(2,3-dimethylphenyl)ethyl]-1H-imidazol-1-yl}-2-methylprop-2-en-1-one, 1-{5-[1-(2,3-dimethylphenyl) ethyl]-1H-imidazol-1-yl}-2-methylprop-2-en-1-one, 2-({4-[1-(2,3-dimethylphenyl)ethyl]-1H-imidazole-1-carbonyl}amino)ethyl 2-methylprop-2-enoate, 2-({5-[1-(2,3-dimethylphenyl)ethyl]-1H-imidazole-1-carbonyl}amino)ethyl 2-methylprop-2-enoate, 4-[1-( 2,3-dimethylphenyl)ethyl]-1-(prop-2-ene-1-sulfonyl)-1H-imidazole, 5-[1-(2,3-dimethylphenyl)ethyl]-1-(prop-2-ene-1-sulfonyl)-1H-imidazole, prop-2-en-1-yl 4-[1-(2,3-dimethylphenyl)ethyl]-1H-imidazole-1-carboxylate, prop-2-en-1-yl 5-[1-(2,3-dimethylphenyl)ethyl]-1H-imidazole-1-carboxylate, 4-[1-(2,3-dimethylphenyl)ethyl]-N-(prop-2-en -1-yl)-1H-imidazole-1-carboxamide, 5-[1-(2,3-dimethylphenyl)ethyl]-N-(prop-2-en-1-yl)-1H-imidazole -1-carboxamide, 2-({4-[1-(2,3-dimethylphenyl)ethyl]-1H-imidazole-1-carbonyl}amino)ethyl prop-2-enoate, 2-({5-[1-(2,3-dimethylphenyl)ethyl]-1H-imidazole-1-carbonyl}amino) ethyl prop-2-enoate, 2-({4-[1-(2,3-dimethylphenyl)ethyl]-1H-imidazole-1-carbonyl}amino)ethyl prop-2-enoate, 2-({5-[1-(2,3-dimethylphenyl)ethyl]-1H-imidazole-1-carbonyl}amino)ethyl prop-2-enoate, 3-(4-[1-(2,3-dimethylphenyl)ethyl]-1H-imidazole-1-dimethylsilyl)propyl 2-methylprop-2-enoate and 3-(5-[1-(2,3-dimethylphenyl) ethyl]-1H -imidazole-1-dimethylsilyl)propyl 2-methylprop-2-enoate.

8. An antifouling composition comprising a polymer according to claim 1 and a solvent.

9. The composition according to claim 8, further comprising free medetomidine or an enantiomer, base or salt thereof, not covalently bound to any repeating unit or monomer.

10. The polymer according to claim 2, wherein the co-polymer further comprises a third type of repeating unit, wherein the third type of repeating unit is different than the second type of repeating unit and lacks medetomidine, or an enantiomer, base or salt thereof.

11. The polymer according to claim 2, wherein the co-polymer further comprises a third type of repeating unit that comprises medetomidine, or an enantiomer, base or salt thereof and is covalently bound to the third-type of repeating unit through a hydrolysable bond, and wherein the third type of repeating unit is different than the first type of repeating unit.

12. An antifouling polymer comprising a plurality of repeating units, wherein the polymer is a co-polymer, and the plurality of repeating units are repeating units derived from:

(a) a first monomer, wherein the first monomer is a medetomidine-containing acrylate or a medetomidine-containing methacrylate;

(b) a second monomer, wherein the second monomer is a silyl acrylate or a silyl methacrylate; and (c) a third monomer, wherein the third monomer is methyl methacrylate (MMA).

13. The polymer according to claim 12, wherein the second monomer is tri-isopropylsilyl acrylate (TIPSA).

14. The polymer according to claim 12, wherein the first monomer is selected from the group consisting of 2-({4-[1-(2,3-dimethylphenyl)ethyl]-1H-imidazole-1-carbonyl}amino)ethyl prop-2-enoate (M5) and 2-({4-[1-(2, 3-dimethylphenyl)ethyl]-1H-imidazole-1-carbonyl}amino) ethyl 2-methylprop-2-enoate (M6).

15. The polymer according to claim 12, wherein the plurality of repeating units are further derived from a fourth monomer selected from the group consisting of 2-methoxyethyl acrylate (MEA) and butyl methacrylate (BMA).

* * * * *